(12) United States Patent  
Stenneth

(10) Patent No.: US 10,202,115 B2
(45) Date of Patent: Feb. 12, 2019

(54) METHOD AND APPARATUS FOR TRIGGERING VEHICLE SENSORS BASED ON HUMAN ACCESSORY DETECTION

(71) Applicant: HERE Global B.V., Eindhoven (NL)

(72) Inventor: Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 170 days.

(21) Appl. No.: 15/264,180

(22) Filed: Sep. 13, 2016

(65) Prior Publication Data

US 2018/0072313 A1 Mar. 15, 2018

(51) Int. Cl.
*B60W 30/09* (2012.01)
*B60Q 9/00* (2006.01)

(52) U.S. Cl.
CPC ............. *B60W 30/09* (2013.01); *B60Q 9/008* (2013.01); *B60W 2550/10* (2013.01)

(58) Field of Classification Search
CPC .... B60W 30/09; B60W 2550/10; B60Q 9/008
See application file for complete search history.

(56) References Cited

U.S. PATENT DOCUMENTS

| 6,226,389 | B1 | 5/2001 | Lemelson et al. |
|---|---|---|---|
| 8,165,796 | B2 | 4/2012 | Hoetzer |
| 8,364,311 | B2 | 1/2013 | Heracles |
| 8,989,944 | B1 | 3/2015 | Agarwal et al. |
| 2006/0207818 | A1 | 9/2006 | Fujioka et al. |
| 2008/0266396 | A1 | 10/2008 | Stein |
| 2009/0299622 | A1 | 12/2009 | Denaro |
| 2010/0076621 | A1 | 3/2010 | Kubotani et al. |
| 2010/0253492 | A1 | 10/2010 | Seder et al. |
| 2013/0141578 | A1* | 6/2013 | Chundrlik, Jr. ........ H04N 7/181 348/148 |

(Continued)

FOREIGN PATENT DOCUMENTS

| DE | 102012018099 A1 | 3/2014 |
|---|---|---|
| EP | 2400473 A1 | 12/2011 |

OTHER PUBLICATIONS

Driverless Car Market Watch, "Top misconceptions of autonomous cars and self-driving vehicles", Blog, Jul. 1, 2015, retrieved on Aug. 4, 2016 from http://www.driverless-future.com/?pageid=774, 10 Pages.

(Continued)

*Primary Examiner* — Rodney A Butler
(74) *Attorney, Agent, or Firm* — Ditthavong & Steiner, P.C.

(57) ABSTRACT

An approach is provided for triggering vehicle sensors based on human accessory detection. The approach involves receiving a location of a detection of a human accessory object in a travel network. The human accessory object is a physical object associated with a probability that a human or an animal is within a vicinity of the human accessory object. The approach also involves generating a location-based record of the human accessory object in a map database based on the location. The approach further involves a sensor of a vehicle being activated to detect the human or the animal when the vehicle is detected to enter a geographic area of the travel network associated with the location-based record of the human accessory object.

20 Claims, 15 Drawing Sheets

(56) References Cited

U.S. PATENT DOCUMENTS

2014/0019044 A1* 1/2014 Zanutta ............... G01S 19/34
    701/469
2015/0332102 A1 11/2015 Lu et al.

OTHER PUBLICATIONS

NHTSA, "Preliminary Statement of Policy Concerning Automated Vehicles", 2013, available at http://www.nhtsa.gov/Research/Crash+Avoidance/Automated+Vehicles, pp. 1-14.

* cited by examiner

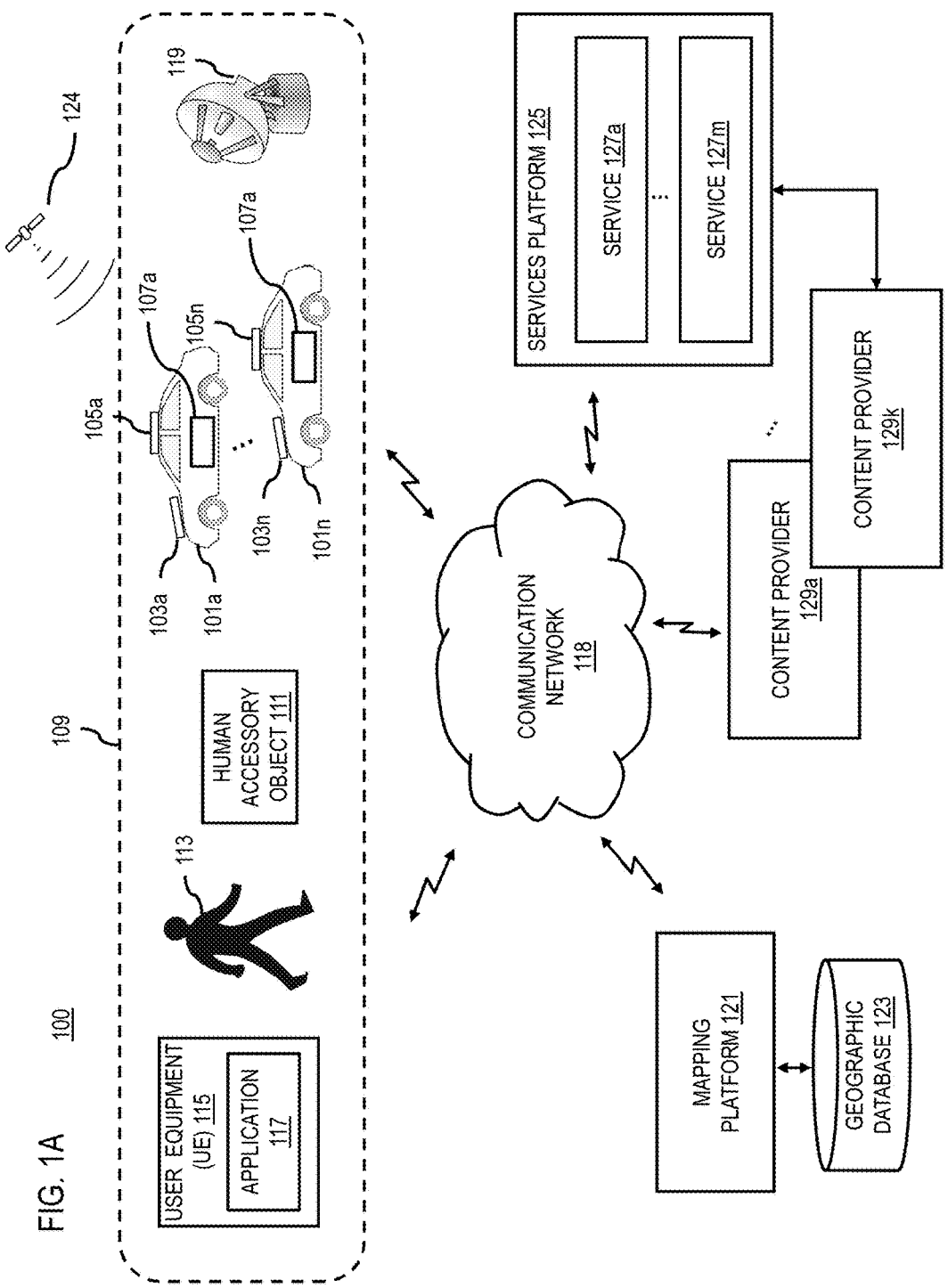

METHOD AND APPARATUS FOR TRIGGERING VEHICLE SENSORS BASED ON HUMAN ACCESSORY DETECTION

BACKGROUND

Modern vehicles (e.g., autonomous and non-autonomous vehicles) can be equipped with an array of sensors to provide environmental awareness and improve safety. These sensors may include, for example, advanced sensors such as Light Imaging Detection and Ranging (Lidar) sensors, infrared sensors, and the like. However, in some cases continuous use of such sensors can be resource intensive (e.g., computing resources needed to process sensor data) or cause excessive wear on sensor hardware and related components. Accordingly, there are significant technical challenges to balance the tradeoff on potential safety improvements provided by such sensors against resources available in a vehicle and excess sensor wear.

SOME EXAMPLE EMBODIMENTS

As a result, there is a need for an approach for triggering or activating sensors based on detecting a human accessory object (e.g., an object indicative of a potential nearby presence of a human or animal) in or near the roadway to avoid continuous operation of advanced resource-heavy sensors.

According to one embodiment, a method for activating a vehicle sensor based on mapped human accessory objects comprises receiving a location of a detection of a human accessory object in a travel network. The human accessory object is a physical object associated with a probability that a human or an animal is within a vicinity of the human accessory object. The method also comprises generating a location and temporal-based record of the human accessory object in a map database based on the location and the timestamp of the detection. A sensor of a vehicle is activated to detect the human or the animal when the vehicle is detected to enter a geographic area of the travel network associated with the location-based record of the human accessory object.

According to another embodiment, an apparatus for activating a vehicle sensor based on mapped human accessory objects comprises at least one processor, and at least one memory including computer program code for one or more computer programs, the at least one memory and the computer program code configured to, with the at least one processor, cause, at least in part, the apparatus to detect a location of a vehicle traversing a travel network. The apparatus is also caused to query a map database for a location-based record based on the location of the vehicle. The location-based record is generated to indicate whether a geographic area of the travel network is associated with a human accessory object that has been previously mapped to the geographic area. The human accessory object is a physical object associated with a probability that a human or an animal is within a vicinity of the human accessory object. The apparatus is further caused to determine that the vehicle is entering the geographic area that is associated with the human accessory object. The apparatus is further caused to trigger an activation of a sensor of the vehicle to detect the human or the animal associated with the human accessory object.

According to another embodiment, a non-transitory computer-readable storage medium carries one or more sequences of one or more instructions which, when executed by one or more processors, cause, at least in part, an apparatus to receive a report from a vehicle. In one embodiment, the report specifies a location where a human accessory object was detected by a first sensor of a vehicle and another location where a human or animal was detected by a second sensor of the vehicle. The human accessory object is a physical object associated with a probability that a human or an animal is within a vicinity of the human accessory object. Further, the second sensor of the vehicle is in a deactivated state and is configured to be activated on a detection of the human accessory object by the first sensor. The apparatus is also caused to generate a location-based record of the human accessory object in a map database based on the location, the another location, or a combination thereof.

According to another embodiment, a system for activating a vehicle sensor based on mapped human accessory objects comprises a vehicle configured with a first sensor and a second sensor. The first sensor is configured to detect a human accessory object in a travel network. The human accessory object is a physical object associated with a probability that a human or an animal is within a vicinity of the human accessory object. The second sensor is in a deactivated state and is configured to be activated on a detection of the human accessory object by the first sensor to detect the human or the animal within a proximity of the vehicle, the vicinity of the human accessory, or a combination thereof. The vehicle is configured to transmit a location where the human accessory object is detected by the first sensor, another location where the human or the animal is detected by the second sensor, or a combination thereof. The system also comprises a mapping platform configured to receive the location, the another location, or a combination thereof. The mapping platform is also configured to generate a location-based record of the human accessory object in a map database based on the location, the another location, or a combination thereof.

According to another embodiment, an apparatus for receiving a location of a detection of a human accessory object in a travel network. The human accessory object is a physical object associated with a probability that a human or an animal is within a vicinity of the human accessory object. The apparatus also comprises means for generating a location-based record of the human accessory object in a map database based on the location. A sensor of a vehicle is activated to detect the human or the animal when the vehicle is detected to enter a geographic area of the travel network associated with the location-based record of the human accessory object.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of triggering vehicle sensors based on human accessory detection, according to one embodiment;

DESCRIPTION OF SOME EMBODIMENTS

Figure 1B:
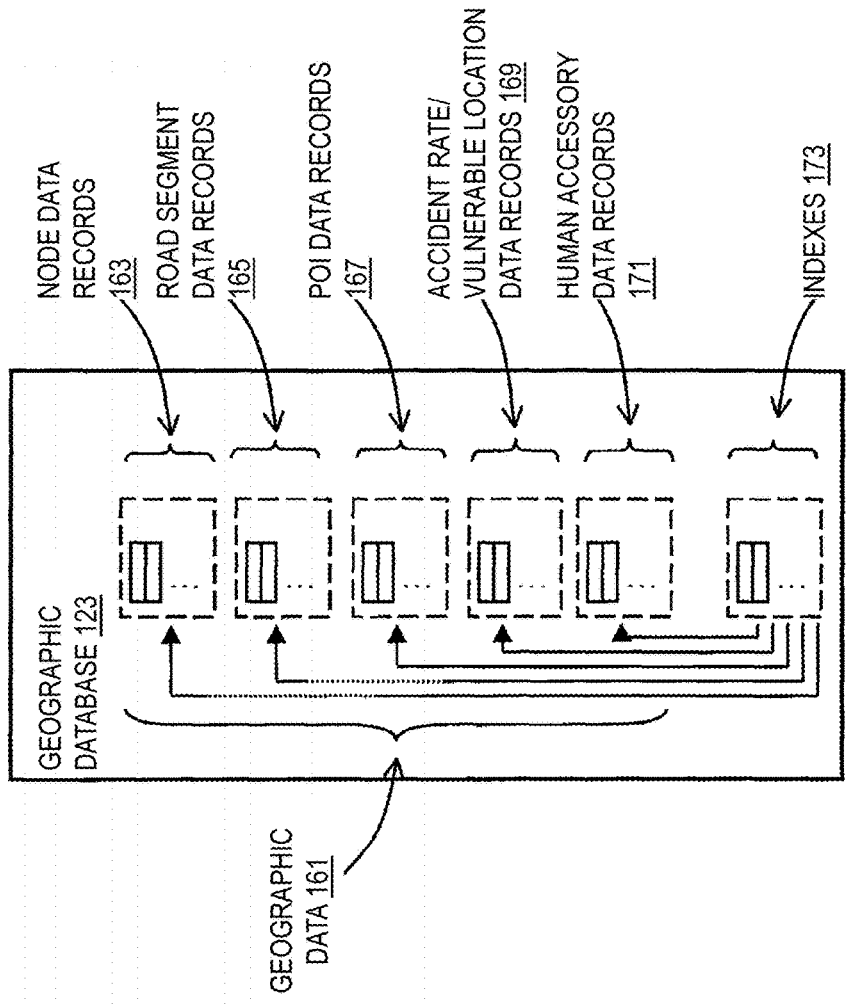
FIG. 1B is a diagram of a geographic database of the system of FIG. 1A, according to one embodiment.

Examples of a method, apparatus, and computer program for triggering vehicle sensors based on human accessory detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of triggering vehicle sensors based on human accessory detection, according to one embodiment. There exists certain physical objects that when spotted or detected in a road or travel network, there is a high chance that a human or animal will gather or chase the same physical object. Example of these objects include a ball, stroller, skating boots, and the like. For example, a ball rolling into a roadway has a high probability that a human or animal is likely to be nearby chasing that object. In one embodiment, these objects are referred to as human accessories or human accessory objects.

At the same time, as discussed above, service providers and manufacturers who are developing vehicle safety technologies, particularly technologies used in autonomous or highly assisted driving vehicles, are challenged to improve safety (e.g., avoiding collisions with pedestrians and animals in the roadway) while also making efficient use of vehicles resources and sensors. For example, vehicles can be equipped with sensors ranging from simple and low cost sensors (e.g., camera sensors, light sensors, etc.) to highly advanced and often very expensive sensors such as Light Imaging Detection and Ranging (Lidar) sensors, Radio Detection and Ranging (Radar), infrared sensors, and the like. In many cases, these sensors can generate large volumes of data, requiring significant computing resources to process. Because vehicles typically demand high reliability and redundancy for its components, including computing components, this high volume of sensor output data can overwhelm the resources available at the vehicle. In addition, many of advanced sensors (e.g., Lidar, Radar, etc.) have moving, retractable, or other parts that may be susceptible excessive wear and premature failure if used continuously.

To address these technical problems, a system 100 of FIG. 1A introduces a capability to trigger activation of a vehicle sensor (e.g., an advanced sensor in an autonomous or highly assisted driving vehicle) after detecting a human accessory object in real time or after entering into a geographic area or region that is known historically to have human accessory objects (e.g., as determined from recorded map data). In one embodiment, when a vehicle detects a presence of a human accessory object, the vehicle reacts differently by activating additional sensors to detect a human or animal that may be nearby, chasing, or within (e.g., in the case of a stroller) the detected human accessory object. In one embodiment, in addition to triggering additional sensors, the vehicle may react by changing its mode of operation (e.g., automatically slowing down, stopping, reverting to manual control if currently in autonomous operating mode, taking an alternate route, etc.) or by changing driving rules (e.g., increased object avoidance, etc.). In this way, the system 100 automatically activates or triggers a vehicle sensor only when a vehicle is expected to be within proximity of a human or animal because it is in proximity of a human accessory object, or take some other autonomous action in response to the detected human accessory object. By way of example, the system 100 activates the vehicle's advanced sensors for detecting humans or animals (e.g., Lidar, infrared, radar, etc.) to increase a likelihood of detecting and avoiding the human or animal in response to the detected human accessory. In one embodiment, the system 100 deactivates the activated sensor when the human accessory is passed or the vehicle exits an area known to have detected human accessories. This embodiment, for instance, advantageously avoids operating the sensor continuously to, e.g., reduce computing resource use, channel bandwidth consumption and sensor wear.

As shown in FIG. 1A, the system 100 comprises vehicles 101a-101n (also collectively referred to as vehicles 101) configured with one or more sensors 103a-103n (also collectively referred to as sensors 103) and one or more advanced sensors 105a-105n (also collectively referred to as advanced sensor 105). In one embodiment, the vehicles 101 are autonomous vehicles or highly assisted driving vehicles that are capable of sensing their environments and navigating within travel network 109 without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";
Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";
Level 2 (Combined Function Automation)—"This level involves automation of at least two primary control functions designed to work in unison to relieve the driver of control of those functions. An example of combined functions enabling a Level 2 system is adaptive cruise control in combination with lane centering.";
Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and
Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 101 that are classified in any of the levels of automation (levels 0-4) discussed above, provided that they are equipped with sensors 103 and/or advanced sensors 105. For example, in the case of autonomous modes of levels of operation, the vehicles 101 can automatically react to detected human accessories 111 (e.g., trigger unactivated sensors, or take other actions such as automatically slow, take a different route, etc.). Even in the case of completely manual driving (e.g., level 0), a vehicle 101 can automatically trigger sensors to provide greater situational awareness to improve safety for drivers. For example, infrared sensors can warn drivers of potential nearby humans or animals even when they may be obscured by vegetation or other obstacles (e.g., walls, roadside objects, etc.).

In one embodiment, the sensors 103 and advanced sensors 105 are controlled by sensor control modules 107a-107n (also collectively referred to as sensor control modules 107) of each of the vehicles 101 to perform the functions of the various embodiment described herein for triggering vehicle sensor activation based on human accessory detection. In one embodiment, the vehicles 101 operate within a road or travel network 109 to detect one or more human accessory objects 111 that have a probability of being associated with one or more nearby humans 113 (or animals—not shown). In one embodiment, the human 113 is equipped with a user equipment 115 (e.g., a mobile terminal, smartphone, etc.) executing an application 117 to facilitate communication over the communication network 118.

In one embodiment, a vehicle sensor can be classified as a sensor 103 if the vehicle sensor (e.g., a camera sensor) is continuously operated to detect a human accessory object 111 for triggering an advanced sensor 105. A vehicle sensor (e.g., Lidar sensor, infrared sensor, radar sensor, etc.) can be classified as an advanced sensor 105 if the vehicle sensor was not previously activated or otherwise previously not configured for detecting potential nearby humans 113 and/or animals before the detection of a human accessory object 111 by a sensor 103. In other words, in one embodiment, whether a sensor is classified as a sensor 103 or an advanced sensor 105 can depend on whether the sensor is configured to detect the human accessory object 111 (in this case, the vehicle sensor is a sensor 103) or the human 113 or animal following detection of the human accessory object 111 or entering an area associated with detected human accessory objects 111 (in this case, the vehicle sensor is an advanced sensor 105). Therefore, in this embodiment, the classification is not based on the actual technology of the vehicle sensor. Accordingly, as technology develops or as configured by a manufacturer, a particularly technology (e.g., Lidar) may be initially classified as an advanced sensor 105 (e.g., if processing or computing resources or sensor wear are to be conserved) and then later classified as a sensor 103 as efficiency or reliability of the sensor improves with future technological development or when even more advanced vehicle sensors are developed.

In one embodiment, a single vehicle sensor may be classified as a sensor 103 when the vehicle sensor is configured to operate with one set of operational parameters (e.g., sampling rate, field of view, resolution, etc.) to detect a human accessory object 111, and then classified as an advanced sensor 105 when the vehicle sensor is configured to operate with another set of operational parameters (e.g., higher sampling rate, larger field of view, higher resolution, etc.). This other set of operational parameters or advanced mode of operation for the sensor 103 can be supported by a combination of software (e.g., increased sampling rate) and/or hardware (e.g., increased rotation of a sensor to increase a field of view, extend higher from the vehicle to provide greater coverage, etc.). For example, an infrared sensor can be configured to operate in either a passive mode (e.g., reading ambient heat signatures of the surrounding area) or in an active mode (e.g., illuminating the surrounding area with infrared waves to increase range, resolution, etc.). In this scenario, the passive configuration of the infrared sensor can be classified as a sensor 103 for performing the initial detection of the human accessory object 111, and then as an advanced sensor 105 for scanning of the presence of a human 113 or animal that may be near the human accessory object 111. In this way, the operating life of the illuminating infrared source can advantageously preserved by not activating the infrared source continuously.

In one embodiment, the travel network 109 is also configured with one or more infrastructure sensors 119 that can also be used to detect the human accessory object 111 and/or the human 113 (or animal) within respective geographic coverage areas of the infrastructure sensors 119. By way of example, the infrastructure sensors 119 may be configured to use any sensing technology (e.g., visible light camera sensors, Bluetooth, infrared sensors, Lidar sensors, radar sensors, acoustic sensors, and the like) to detect the human accessory 111 and/or any humans 113 or animals that may be nearby. In one embodiment, the infrastructure sensors may be used in combination with or in place of any of the vehicle sensors discussed with respect to the various embodiments described herein.

In one embodiment, the vehicles 101 also have connectivity to a mapping platform 121 over the communication network 118. In one embodiment, the mapping platform 121 performs functions related to generating mapping data (e.g., location-based records) to record detected human accessory objects 111 and correlate them to geographic areas described in a geographic database 123. In another embodiment, the mapping platform 121 provides location-based records indicating geographic areas in which human accessories have been detected to the vehicles 101 to trigger activation of the sensors 103 and/or advanced sensors 105 when the vehicles 101 are detected to enter those geographic areas (e.g., as determined by a positioning system such as satellite-based positioning system 124). In one embodiment, the vehicles 101 can be detected to enter the areas by, for instance, geofencing around the location or areas specified in the location-based record, applying a distance threshold from the location or areas specified in the location-based record, and/or any other means for determining a vehicle 101's proximity to the location or area specified in the location-based record. For example, to create a geofence, the mapping platform 121 may specify a virtual perimeter around the location or areas of interest.

In one embodiment, there are different categories of human accessory objects 111. As noted above, human accessory objects 111 are physical objects that have a probability of having a human 113 or animal nearby it when the human accessory objects 111 are detected in the travel network 109. In one embodiment, human accessory objects 111 do not include vehicles designed to travel within the road or travel network 109 (e.g., cars or other road-going vehicles). In one embodiment, these human accessory objects 111 can be classified into at least two categories: (1) those human accessory objects 111 that have a high chance of containing a human or animal (e.g., stroller, wagon, bouncy house, etc.); and (2) those that have a high chance of being chased by a human 113 or animal (e.g., ball, skating boots, toy, etc.).

In one embodiment, a vehicle 101 (e.g., an autonomous or highly assisted driving vehicle) is able to recognize (e.g., by object recognition of captured images or videos from a camera sensor) and distinguish between the two categories of human accessory objects 111. The vehicle 101 can then react differently depending on the categories. Providing different vehicle or driving reactions depending on the category of the human accessory object 111 enables the vehicle 101 to behave more realistically on the road. For example, the vehicle 101 in autonomous mode may carefully drive over a human accessory object 111 that is a golf ball after detecting that the golf ball is not being chased by a human 113 or animal, but the same vehicle 101 is configured to never driver over a human accessory object 111 that may contain a human 113 or animal such as a stroller, bouncy house, wagon, etc., regardless of whether a human 113 or animal is detected.

In one embodiment, a classification system of the sensor control module 107 on the vehicle 101 can use imagery data from vehicle sensors 103 (e.g., camera sensor) to automatically recognize human accessories 111 as the vehicle 101 drives. For example, the imagery data is collected in real-time and analyzed by the sensor control module 107. In one embodiment, the software and/or hardware for determining that a human accessory object 111 is detected resides on the vehicle 101 (e.g., in the sensor control module 107 or another module of the vehicle 101). The software and/or hardware system takes the imagery data as input and extracts features from the image. The extracted features are compared against known feature of a library of physical objects including human accessories 111. In one embodiment, this comparison is performed using machine learning. The machine learning process, for instance, then outputs whether the detected object is a human accessory 111 or not. In one embodiment, the detected object is further classified into one or more categories of human accessory objects (e.g., chaseable objects versus objects that can contain a human or animal) as described above. In yet another embodiment, the machine learning can further define a more specific type of the human accessory object 111. For example, if a ball is detected as the human accessory object 111, the machine learning process can further classify the type of ball based on known features of the ball (e.g., golf ball, basketball, soccer ball, etc.). If the imagery is found to contain a human accessory object 111, the autonomous vehicle reacts.

In one embodiment, this reaction includes activating other sensors (e.g., advanced sensor 105) that were not previously on. For example, the vehicle 101 is driving with its cameras continuously on (e.g., sensors 103), and detects a human accessory object 111 in imagery data collected from the cameras. In response to the detected human accessory object 111, the sensor control module 107 of the vehicle 101 activates advanced sensors 105 such as Lidar or infrared sensors to detect the presence of humans 113 or animals in the region. In the use-case of a human accessory 111 such as a ball, for instance, the vehicle 101 detects the ball using its camera (e.g., sensor 103) and then activates or triggers a Lidar sensor and/or an infrared sensor (e.g., advanced sensors 105). The sensor control module 107 or other component of the vehicle 101 collects the Lidar and/or infrared data to process for the presence of a human 113 or animal in the environment. In this example, the Lidar sensor provides a 360° view of the environment while the infrared sensor can sense the movement of humans 113 or animals near the vehicle 101. One reason why the vehicle 101 may not be able to rely solely on the camera for detection of humans 113 or animals because the human 113 or animal may be outside the camera's view or otherwise invisible to the camera (e.g., behind a wall or plant). Therefore, by the time the vehicle's or car's camera sees the human 113 or animal, it may be too late to avoid a potential collision. Hence, the use of more advanced object and activity detection sensors (e.g., advanced sensors 105) such as infrared and/or Lidar sensor can detect human 113 or animals approaching the human accessory object 111 after the detection of the human accessory object 111. Thus, the vehicle 101 can preemptively detect the approaching human 113 or animal by seeing a human accessory object 111 that is highly associated with a human 113 or animal.

In one embodiment, the sensors 103, advanced sensors 105, and/or the infrastructure sensors 119 can be triggered by historical data on human accessory 111 presence. For example, if several other vehicles observe human accessories 111 in the same area over a period of time, the mapping platform 121 marks the area as a hotspot for human accessories. In other words, the mapping platform 121 constructs a map of when and where other vehicles 101 detected human accessory objects 111 and/or activated their advanced sensors 105 to determine when and where to activate sensors of other vehicles 101 in the future.

In one embodiment, when a human accessory 111 is detected and reported to the mapping platform 121. When the mapping platform 121 generates a location-based record to record the detection, the mapping platform 121 can also generate a confidence value associated with the location-based record. In one embodiment, the confidence value can indicate a likelihood of encountering the detected human accessory 111 or other human accessory 111 at or near the same location. In one embodiment, the confidence value is dynamic and increases as other vehicles 101 detect human accessories 111 at or near the same location. In another embodiment, if other vehicles 101 pass the same location without detecting a human accessory 111 and reports this lack of detection to the mapping platform 121, the mapping platform 121 can decrease the confidence value by a certain amount with each passing vehicle 101 that does not report a detection. Eventually, when the confidence value falls below a threshold value, the location-based record of the human accessory object 111 is removed by the mapping platform 121 (e.g., removed from a geographic database 123 described below).

In one embodiment, vehicles 101 can transmit location data (e.g., geographic coordinates) of any human accessories 111 that they detect to the mapping platform 121 over, e.g., the communication network 118. The vehicles 101 can also transmit identification and/or characteristics of the detected human accessory 111, a time of detection, activation states of the various sensors 103/advanced sensors 105, and/or any other related information (e.g., weather, speed, etc.). The mapping platform 121 then processes the data received from these vehicles 101 to generate location-based data records that represent a map of the human accessory objects 111 detected within geographic areas covered by the geographic database 123.

In one embodiment, when newly arriving vehicles 101 are detected to enter the hotspot or geographic areas associated with detected human accessory objects 111 (e.g., via geofencing, distance threshold, etc.), the vehicles 101 can automatically activate their sensors 103 and/or advanced sensors 105 without having to first detect a human accessory 111 within vicinity of the vehicles 101. For example, a vehicle 101 may use navigation systems to query the geographic database 123 or a local copy of the geographic database 123 to determine whether the vehicle 101 is entering an area marked in the geographic database 123 as being associated with previously detected human accessories 111. For example, querying the database may result in return of a geofenced area or a distance threshold value. The vehicle 101's determined position can then be evaluated to determine whether the vehicle is within the geofenced area or within the distance threshold to determine that the vehicle 101 has entered the marked area. Based on the results of the query, the vehicle 101 can then activate additional sensors 103 and/or advanced sensors 105. Similarly, if the vehicle is detected to exit a marked area or passes a location of a detected human accessory 111 beyond a threshold distance, then the vehicle can deactivate the sensors 103 and/or advanced sensors 105 that it activated on entering the area or detecting the accessory 111.

In one embodiment, the mapping platform 121 can use additional map information or characteristics to determine when a location-based record should be generated to mark a geographic area for triggering or activating additional sensors 103, advanced sensors 105, and/or infrastructure sensors 119. In one embodiment, the mapping platform 121 uses a database or map of high pedestrian accident areas (e.g., map links, Traffic Message Channels (TMCs), lanes, intersections, etc.) to determine when to trigger the additional sensors 103, advanced sensor 105, and/or infrastructure sensors 119. In other words, advanced sensors 105 on the vehicle 101 are automatically triggered with the vehicle enters a pedestrian accident hotspot marked in the database. In one embodiment, to determine pedestrian hotspots, the mapping platform 121 can query a database (e.g., the geographic database 123 or other database of accident data) for accidents, and then filter those accidents that involve pedestrians. The pedestrian hotspot, for instance, would be any region or geographic area where there are several accidents (e.g., above an accident threshold) over a period of time. In one embodiment, areas of overlap between pedestrian hotspots and detected human accessories can be used as the marked areas for triggering or activating the additional sensors 103, advanced sensor 105, and/or infrastructure sensors 119.

In another embodiment, the mapping platform 121 uses a database or map of vulnerable road user locations to determine when to trigger the additional sensors 103, advanced sensor 105, and/or infrastructure sensors 119. By way of example, vulnerable road user locations are locations in the geographic database 123 where pedestrians are potentially exposed or vulnerable to potential collisions with vehicles. These vulnerable road user locations include, but are not limited to, pedestrian crossings, parks, bus stops, school zones, etc. In other words, the additional sensors 103, advanced sensor 105, and/or infrastructure sensors 119 are automatically triggered when the vehicle 101 is detected to enter an area with vulnerable road users (e.g., via geofencing or distance threshold). This way, the activated sensors can spot or detect a pedestrian that may cross paths with the vehicle 101, such as, when a pedestrian is running to catch a bus at a bus stop (e.g., a vulnerable road user location) or running to catch a green light at a pedestrian crossing (e.g., another vulnerable road user location). In one embodiment, areas of overlap between vulnerable road user locations and detected human accessories can be used as the marked areas for triggering or activating the additional sensors 103, advanced sensor 105, and/or infrastructure sensors 119.

In one embodiment, the mapping platform 121 can search or query a database (e.g., the geographic database 123) for infrastructure sensors 119 that are within or have sensor areas overlapping the locations or areas in which the vehicle 101 is traveling. In one embodiment, as the vehicle 101 moves from one location to the next, different infrastructure sensors 119 can be selected and activated to provide sensor coverage of the vehicle 101 as it moves.

In one embodiment, as previously noted, the mapping platform 121 receives data from a vehicle 101 that a human accessory object 111 has been detected at location of the travel network 109. In one embodiment, the location and time of where and when the human accessory object 111 was detected is saved by the mapping platform 121 for analysis. For example, if over time, the mapping platform 121 receives data indicating that other vehicles 101 are also detecting human accessories 111 (e.g., the same or similar type of human accessory 111 as previously detected, or any human accessory object 111 in general), the location or a geographic area (e.g., within a predetermined distance of the location) can be marked as being associated with detected human accessory objects 111 or has potentially containing vulnerable road users. In one embodiment, the mapping platform 121 can also use a point-of-interest (POI) detection algorithm to identify or classify the location or geographic area. For example, a presence of human accessories 111 that are identified as strollers may indicate a presence of a daycare center as a POI at or near the location. Similarly, a presence of human accessories 111 that are identified as balls may indicate a presence of a playground or park as a POI at or near the location. By marking these areas as associated with detected human accessory objects 111, the mapping platform 121 enables new vehicles 101 entering the marked location or area to adjust their driving style or sensor activation status even without detecting a human accessory 111.

In one embodiment, when a vehicle 101 detects a human accessory object 111 or enters an area or location marked has associated with previously detected human accessory objects 111 (e.g., determined by geofencing, distance thresholding, etc.), the vehicle 101 can trigger activation of additional sensors 103 or advanced sensors 105 at the detecting vehicle 101, at one or more other neighboring vehicles 101, or at nearby infrastructure sensors 119. For example, neighboring vehicles 101 can include vehicles 101 that are in front of or behind the detecting vehicle 101. Activating sensors at these neighboring vehicles 101 or nearby infrastructure sensors 119 enables an expansion of sensor coverage area to advantageously increase a likelihood of detecting any humans 113 or animals nearby the detected human accessory object 111. In addition, the neighboring vehicles 101 and/or infrastructure sensors 119 may be equipped with additional sensors that are not available in the detecting vehicle 101. These additional sensors, again, may enable the system 100 to improve a likelihood of detecting nearby humans 113 or animals. In one embodiment, the sensor data may be shared among the vehicles 101 over the communication network 118 using a peer-to-peer process or a cloud-based process (e.g., via mapping platform 121).

In one embodiment, once the additional sensors 103, advanced sensor 105, and/or infrastructure sensors 119 are activated (e.g., Lidar), the sensors can be used first to detect nearby humans 113 or animals, and then to detect a heading of the nearby humans 113 or animal. In one embodiment, the vehicle 101 can transmit a warning notification to all detected nearby humans 113 (e.g., via their respective UEs 115). In another embodiment, the vehicle 101 can transmit warning notifications to only those humans 113 whose heading data indicate that they are moving towards the detected human accessory object 111 and/or the vehicle 101. In one embodiment, the humans 113 can subscribe to a notification service (e.g., provided by the mapping platform 121) to receive such notifications, for instance, via the application 117. In one embodiment, the vehicle 101 can cancel the previously sent notifications when the vehicle 101 passes a location of the detected human accessory 111 beyond a predetermined distance.

In one embodiment, after detecting a human accessory 111 (or entering an area associated with previously detected human accessories) and triggering the additional sensors 103, advanced sensor 105, and/or infrastructure sensors 119, the vehicle 101 displays the sensor data feeds or output from the sensors on a watchable screen of the vehicle 101 for viewing. For example, after the vehicle detects a human accessory object 111, the vehicle 101 activates an advanced sensor 105 (e.g., Lidar sensor). On a screen in the vehicle 101, the vehicle 101 displays the Lidar imagery or point cloud. In this way, the driver or passengers within the vehicle 101 get a sense of what is around the vehicle 101.

In one embodiment, once the human accessory object 111 is detected by the vehicle 101, the vehicle 101 can take a picture or video of the human accessory object 111 using the vehicle's camera. The picture or video can be saved by the vehicle 101 and then transmitted to the mapping platform 121, another vehicle 101, or any other component of the system 100. In one embodiment, the human 113 can transmit a picture or video of a human accessory object 111 captured via a camera of the UE 115 to the mapping platform 121 or other platform to register the accessory 111 for detection. In one embodiment, the application 117 of the UE 115 can be used to transmit or communicate with the mapping platform 121 or other platform. For example, in addition to the mapping platform 121, the picture or video can be transmitted to a services platform 125, one or more services 127a-127m (also collectively referred to as service 127) of the services platform 125, or content providers 129a-129k (also collectively referred to as content providers 129).

In one embodiment, once a human accessory object 111 is detected by a vehicle 101 or the vehicle 101 enters a geographic area associated with previously detected human accessory objects 111 (e.g., as indicated in the geographic database 123 by the mapping platform 121 via geofencing, distance thresholding, etc.), the vehicle 101 can modify a current state of the vehicle. For example, modifying a current state includes deploying external airbags to guard against potential collisions with humans 113 or animals, turning fog lights or high beam lights on for better visibility, and the like. After passing the detected human accessory object 111 or exiting the geographic area, the vehicle can return to its previous state active before detecting the accessory 111 or entering the area (e.g., retract external airbags, turn lights off, etc.).

By way of example, the UE 115 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 115 can support any type of interface to the user (such as "wearable" circuitry, etc.). In one embodiment, the one or more vehicles may have cellular or Wi-Fi connection either through the inbuilt communication equipment or from the UE 115 associated with the vehicles 101.

By way of example, the applications 117 may be any type of application that is executable at the UE 115, such as mapping application, location-based service applications, navigation applications, content provisioning services, camera/imaging application, media player applications, social networking applications, calendar applications, and the like. In one embodiment, one of the applications 117 at the UE 115 may act as a client for the mapping platform 121 over the communication network 118.

By way of example, as previously sated the sensors 103 and/or advanced sensors 105 may be any type of sensor. In certain embodiments, the sensors 103 and/or advanced sensor 105 may include, for example, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., for detecting human accessory objects 111), an audio recorder for gathering audio data (e.g., detecting nearby humans 113 or animals via acoustic signatures such as voices or animal noises), velocity sensors, and the like. In another embodiment, the advanced sensors 105 may include sensors (e.g., mounted along a perimeter of the vehicle 101) to detect the relative distance of the vehicle from lanes or roadways, the presence of other vehicles, pedestrians, animals, traffic lights, road features (e.g., curves) and any other objects (e.g., human accessory objects 111), or a combination thereof. In one scenario, the sensors 103 and/or advanced sensors 105 may detect weather data, traffic information, or a combination thereof. In one example embodiment, the vehicles may include GPS receivers to obtain geographic coordinates from satellites 124 for determining current location and time. Further, the location can be determined by a triangulation system such as A-GPS, Cell of Origin, or other location extrapolation technologies when cellular or network signals are available. In another example embodiment, the one or more sensors may provide in-vehicle navigation services.

The communication network 118 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 121 may be a platform with multiple interconnected components. The mapping platform 121 may include multiple servers, intelligent networking devices, computing devices, components and corresponding software for determining safety levels for one or more locations based, at least in part, on signage information. In addition, it is noted that the mapping platform 121 may be a separate entity of the system 100, a part of the services platform 125, the one or more services 127, or the content providers 129.

In one embodiment, the geographic database 123 stores information on road links (e.g., road length, road breadth, slope information, curvature information, etc.), probe data for one or more road links (e.g., traffic density information), historical accident data, vulnerable road user location, and detected human accessory objects 111 associated the road links or other geographic areas. The information may be any multiple types of information that can provide means for triggering vehicle sensor activation based on human accessory detection. In another embodiment, the geographic database 123 may be in a cloud and/or in a vehicle 101 (e.g., cars) and/or a mobile device (e.g., UE 115).

By way of example, the vehicles 101, the UEs 115, the mapping platform 121, the services platform 125, and the content provider 129 communicate with each other and other components of the communication network 118 using well known, new or still developing protocols. In this context, a protocol includes a set of rules defining how the network nodes within the communication network 118 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 123 of system 100, according to exemplary embodiments. In the exemplary embodiments, detected human accessory data can be stored, associated with, and/or linked to the geographic database 123 or data thereof. In one embodiment, the geographic or map database 123 includes geographic data 161 used for (or configured to be compiled to be used for) mapping and/or navigation-related services, such as for location-based triggering of vehicle sensors as discussed in the various embodiments described herein. The geographic data 161 can also be used for personalized route determination, according to exemplary embodiments. For example, the geographic database 123 includes node data records 163, road segment or link data records 165, POI data records 167, accident rate/vulnerable location records 169, human accessory data records 171, and indexes 173 for example. More, fewer or different data records can be provided. In one embodiment, the additional data records (not shown) can include cartographic ("carto") data records, routing data, and maneuver data. In one embodiment, the indexes 173 may improve the speed of data retrieval operations in the geographic database 123. The indexes 173 may be used to quickly locate data without having to search every row in the geographic database 123 every time it is accessed.

In exemplary embodiments, the road segment data records 165 are links or segments representing roads, streets, parking areas, or paths, as can be used in the calculated route or recorded route information for determination of one or more personalized routes, according to exemplary embodiments. The node data records 163 are end points corresponding to the respective links or segments of the road segment data records 165. The road link data records 165 and the node data records 163 represent a road network or travel network 109, such as used by vehicles, cars, and/or other entities. Alternatively, the geographic database 123 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 123 can include data about the POIs and their respective locations in the POI data records 167. The geographic database 123 can also include data about places, such as cities, towns, or other communities, and other geographic features, such as bodies of water, mountain ranges, etc. Such place or feature data can be part of the POI data 167 or can be associated with POIs or POI data records 167 (such as a data point used for displaying or representing a position of a city).

In one embodiment, the geographic database 123 also includes accident rate/vulnerable location data records 169. For example, data records 169 may specify an accident rate associated with the links or nodes of the geographic data 161. The accident rate can be further specified by mode of transport (e.g., vehicle, pedestrian, etc.). In this way, the accident rate/vulnerable location data records 169 can provide information on pedestrian accident rates occurring at a particular location. In addition, the data records 169 can indicate whether a link or node of the geographic data includes any locations that are considered to be vulnerable road user locations that may potentially expose pedestrians to potential collision with vehicular traffic. As previously described, these locations include, but are not limited to, pedestrian crossings, parks, bus stops, school zones, etc.).

In one embodiment, the geographic database 123 also includes human accessory data records 171. The data records 171 are, for instance, location-based records (e.g., records tied to a specific geographic location) that indicate whether human accessory objects 111 have been previously detected at the locations. In addition, the data records 171 may also record a time at which the detections occurred as well as characteristics of the environment or the human accessory object 111 that was detected. In one embodiment, the data records 171 also reflect whether humans 113 and or animals were also detected in combination with the detected human accessory object 111. In yet another embodiment, the data records 171 may include pictures or videos received from vehicles 101 and/or UEs 115 depicting detected human accessory objects 111. In one embodiment, the location-based records may further specify a geofenced area and/or distance threshold to facilitate determine when vehicles 101 enter or exit a marked area of interest.

The geographic database 123 can be maintained by the content provider in association with the services platform 125 (e.g., a map developer). The map developer can collect geographic data to generate and enhance the geographic database 123. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used. In one embodiment, vehicles 101 operating with the travel network 109 can report human accessory detections to the mapping platform 121 for recording in the geographic database 123.

The geographic database 123 can be a master geographic database stored in a format that facilitates updating, maintenance, and development. For example, the master geographic database 123 or data in the master geographic database 123 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as a navigation system of the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 123 can be a master geographic database, but in alternate embodiments, the geographic database 123 can represent a compiled navigation database that can be used in or with end user devices (e.g., vehicles 101, UEs 115) to provided navigation-related functions or location-based functions (e.g., triggering vehicle sensor activation based on human accessory detection or entering an area associated with previously detected human accessory objects 111). For example, the geographic database 123 can be used with the vehicle 101 to provide an end user with navigation features. In such a case, the geographic database 123 can be downloaded or stored in a navigation system of the vehicle 101, or the vehicle 101 can access the geographic database 123 through a data connection over the communication network 118, for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device can be a cellular telephone. An end user can use the navigation device or system for navigation functions, for example, road link map updates.

Figure 2:
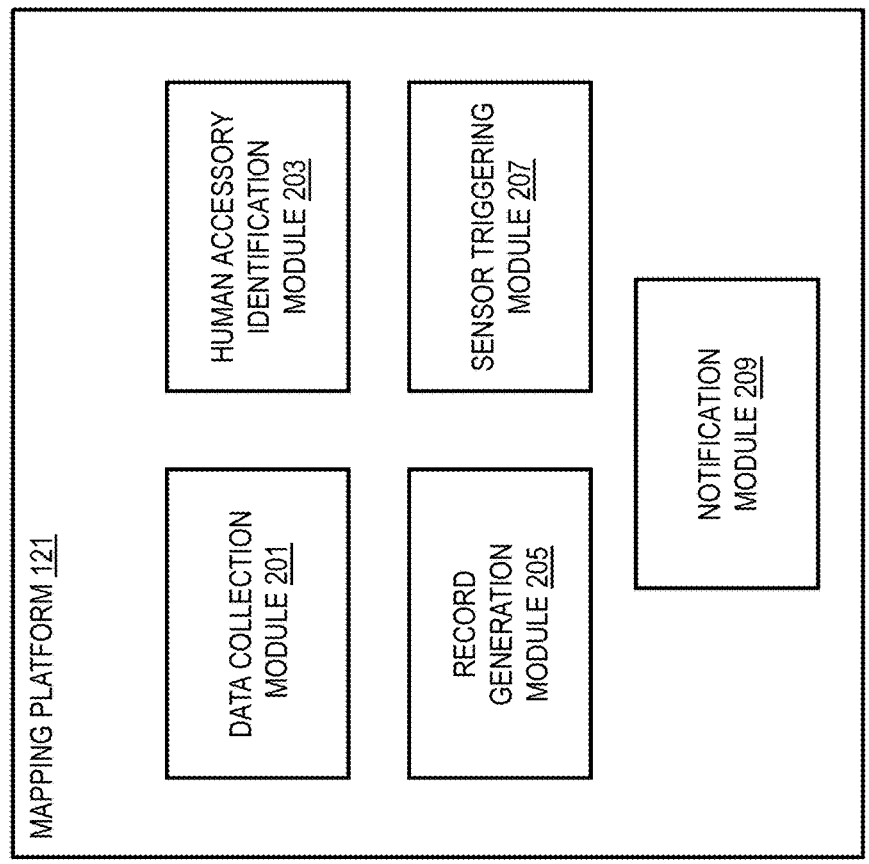
FIG. 2 is a diagram of the components of a mapping platform, according to one embodiment.

FIG. 2 is a diagram of the components of a mapping platform 121, according to one embodiment. By way of example, the mapping platform 121 includes one or more components for mapping detected human accessory objects 111 for triggering vehicle sensor activation (e.g., on entering a mapped area) or deactivation (e.g., when exiting the mapped area). It is contemplated that the functions of these components may be combined in one or more components or performed by other components of equivalent functionality. In one embodiment, the mapping platform 121 includes a data collection module 201, a human accessory identification module 203, a record generation module 205, a sensor triggering module 207, and a notification module 209.

In one embodiment, the data collection module 201 receives reports of detected human accessory objects 111 from vehicles 101 operating in the travel network 109. For example, the vehicles 101 can transmit to the data collection module 201 reports indicating at least a location and a time where a human accessory 111 was detected. In one embodiment, the vehicles can transmit additional information such as the type of the object, environmental conditions (e.g., weather, light level, etc.), type of sensor used to detect the object, operating state of the vehicle, activation status of other sensors on the vehicle 101, and the like.

In one embodiment, the data collection module 201 can begin monitoring a particular geographic area once a report indicating a detection of a human accessory object 111 is received with respect to the location. This monitoring includes collecting other detection reports from other vehicles. In one embodiment, the data collection module 201 also monitors or collects reports about whether a vehicle 101 subsequently detects a human 113 or animal within vicinity of the detected human accessory object 111 for later analysis. In one embodiment, the monitoring can be used to generate or dynamically modify a confidence value that indicates, for instance, a likelihood that another vehicle 101 will detect a human accessory 111 at or near the same location. For example, the confidence value is increased when other vehicles 101 in the area detect human accessories 111 and decreased when other vehicles 101 do not detect human accessories 111 at or near the marked location.

In another embodiment, the data collection module 201 receives captured media (e.g., pictures, videos, audio, etc.) of the detected human accessory objects 111. For example, as previously discussed, a vehicle 101 that detects a human accessory object 111 can activate its camera to capture a picture or video to the detected human accessory objects 111. This captured media can be processed later or forwarded to other vehicles 101 detected to be nearby the location of the detected human accessory 111.

In one embodiment, the human accessory identification module 203 can process the received human accessory detection data collected by the data collection module 201 to further characterize or identify the detected human accessory object 111. For example, the human accessory identification module 203 can correlate the detection a human accessory object 111 with a subsequent detection of a human 113 or animal nearby the detected human accessory object 111. In this way, the human accessory identification module 203 can determine or provide data to determine a probability that detecting a particular human accessory object 111 would result in a detection of corresponding human 113 or animal. For example, if the human accessory identification module 203 receives 10 reports indicating a detection of a ball, and subsequent reports indicate that of those 10 detected balls, 5 instances resulted in also detecting a human 113 nearby. Then a probability of the ball being associated with a human 113 or animal nearby can be calculated (e.g., a probability of 0.5). In one embodiment, the system 100 can configured whether a particular human accessory 111 will be used to trigger activation of vehicle sensors based on whether the probability is greater than a minimum threshold. This minimum threshold can be set based on a desired safety margin.

In one embodiment, the record generation module 205 processes the collected human accessory detection reports to determine whether to generate a location-based record (e.g., a human accessory data record 171 of the geographic database 123) to indicate or mark that a particular area or location is associated with a previously detected human accessory object 111. In one embodiment, the record generation module can determine whether human accessory objects 111 were detected in the same area over a period of time. If more than a minimum number of detection reports are received about the geographic over that time period, then the record generation module 205 can generate a location-based record to associate the geographic area with previously detected human accessories 111. In one embodiment, the record generation module 205 can use additional contextual parameters (e.g., time of day, day of week, season, weather, etc.) to qualify the human accessory data record 171. For example, balls may indicate a higher probability of the presence of a human 113 nearby when detected in the afternoon (e.g., when children are more likely at play) than when the ball is detected after midnight. In one embodiment, the location-based records of detected human accessory objects 111 are mapped so that vehicles detected to be entering the areas can automatically trigger or activate sensors (e.g., sensors 103, advanced sensors 105, infrastructure sensors 119) based, for instance, on querying the human accessory data records 171. Similarly, vehicles detected to be exiting or leaving the areas can automatically deactivate the sensors.

In one embodiment, the record generation module 205 can also define sensor triggering areas, based on accident rates or presence of vulnerable road user locations as previously discussed. In one embodiment, the record generation module 205 can query for pedestrian accident rates for a database or map (e.g., accident rate data records 169) to identify areas or locations with pedestrian accident rates above a threshold. These areas can then marked in the geographic database 123 for triggering or activating vehicle sensors.

In another embodiment, the record generation module 205 can query the geographic database 123 to identify vulnerable road user locations where pedestrians may be vulnerable to potential collisions with vehicles because their paths can potentially cross. As noted above, these areas include, but are not limited to, pedestrian crossings, bus stops, etc. In other words, the record generation module 205 can use the physical structure or topology of a map to determine what areas or locations can potentially be associated with increased risk to pedestrians without requiring knowledge of the actual accident rate as discussed in the embodiment above. In one embodiment, information of vulnerable road user locations can be queried from vulnerable location data records 169 of the geographic database 123.

In one embodiment, the sensor triggering module 207 responds to queries for information regarding geographic areas in which a vehicle 101 should automatically activate a vehicle sensor on entering and deactivate the vehicle sensor on leaving. The sensor triggering module 207 interacts with the location records marked or generated by the record generation module 205 to determine the geographic areas, locations, or map data records about the areas or locations that should be returned to the vehicle 101. For example, a vehicle 101 may determine its location and query the geographic database 123 via the sensor triggering module 207 to determine additional sensors 103, advanced sensors 105, infrastructure sensors 119, and/or sensors of other neighboring vehicles 101 should be triggered. In one embodiment, the triggering criteria is based on whether the geographic database 123 indicates that the vehicle 101 is in an area associated with previously detected human accessory objects 111, high pedestrian accident rates, vulnerable road user locations, or a combination thereof. In one embodiment, whether the vehicle 101 is entering or exiting the area associated with previously detected human accessory objects 111 is based on geofencing, distancing thresholding, and/or the like.

In one embodiment, the notification module 209 of the mapping platform 121 facilitates transmission of warning notifications to devices (e.g., UEs 115) of nearby humans 115 when a human accessory object 111 is detected near a vehicle 101. In one embodiment, the notification system is a service provided by the mapping platform 121 to which end users (e.g., humans 113) can subscribe to receive such notification warnings through respective UEs 115. In one embodiment, the notification module 209 can receive a report indicating a location and time of detection of a human accessory object 111 by a vehicle 101. In one embodiment, the report can indicate a detected presence of one or more humans. In response, the notification module 209 can transmit a warning notification. The warning notification, for instance, can alert the user that a human accessory object 111 near the user has been detected by an approaching vehicle 101. In some embodiment, the report from the vehicle can also use a heading of the detected human 113 to determine whether the human 113 is approaching or moving towards the detected human accessory object 111 or the detecting vehicle 101. In this embodiment, the notification module transmits the warning only to those users who have been determined to be heading towards the detected human accessory object 111 or vehicle 101.

In one embodiment, the UE 115 of the human 113 can be configured to transmit its location to the notification module 209. The notification module 209 can then compare the UE 115's location to the location of the detected human accessory object 111 to determine whether to transmit a warning notification to the UE 115 (e.g., if the UE 115 is within a certain distance threshold or moving towards the detected human accessory object 111). In this way, the notification module 209 can transmit the notification without needing the vehicle 101 to also detect and report the user or human 113.

The above presented modules and components of the mapping platform 121 can be implemented in hardware, firmware, software, or a combination thereof.

Figure 3:
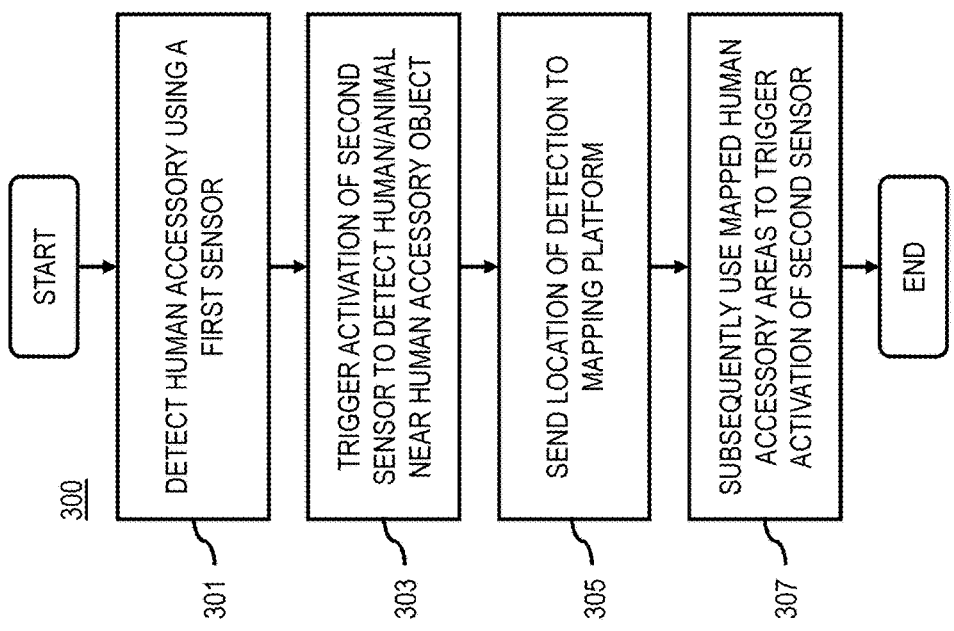
FIG. 3 is a flowchart of a process for providing human accessory detection data to a mapping platform, according to one embodiment.
Figure 13:
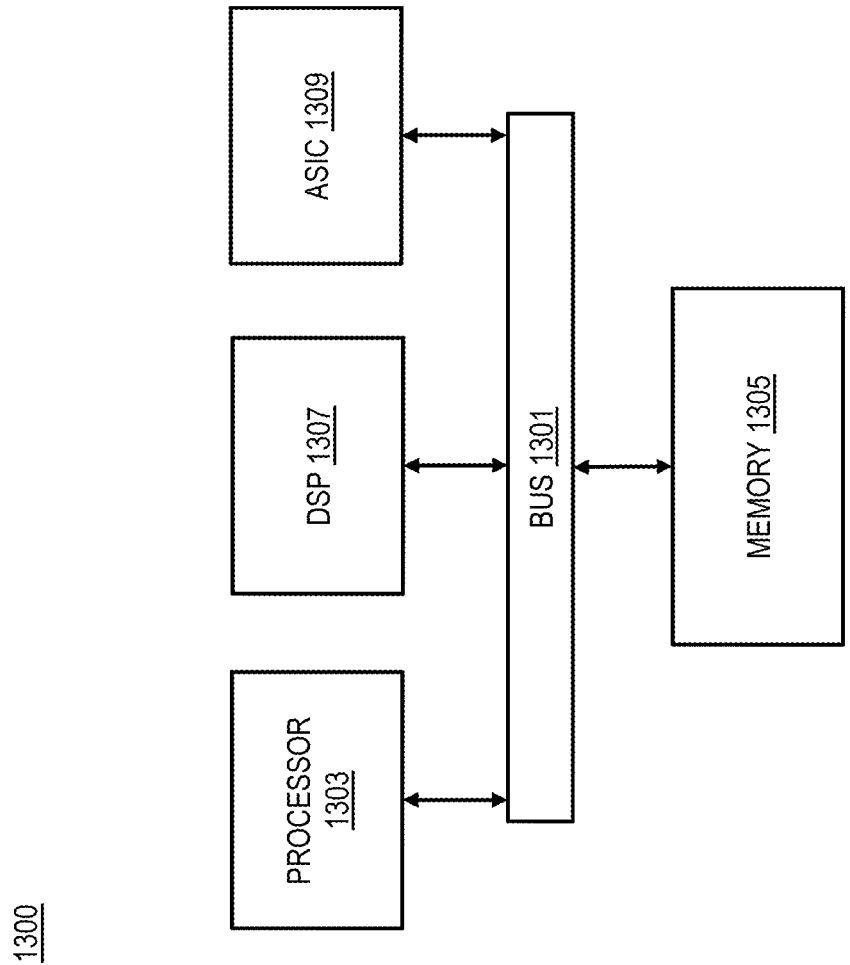
FIG. 13 is a diagram of a chip set that can be used to implement an embodiment of the invention.

FIG. 3 is a flowchart of a process for providing human accessory detection data to a mapping platform, according to one embodiment. In one embodiment, the sensor control module 107 or other module of the vehicle 101 performs the process 300 and is implemented in, for instance, a chip set including a processor and a memory as shown in FIG. 13. The process 300 is presented from the perspective a vehicle used for detecting human accessory objects 111 for reporting to the mapping platform 121. In some embodiments, one or more steps of the process 330 can be started or performed independently of other steps described in the process, and need not be performed in its entirety by a single vehicle 101 or in the presented sequence.

In step 301, the sensor control module 107 detects a human accessory object 111 in a travel network 109 (e.g., a roadway) using a first sensor of the vehicle 101. In one embodiment, the first sensor (e.g., a sensor 103) is configured to detect a human accessory object in a travel network. As previously described, the human accessory object 111 is a physical object associated with a probability that a human or an animal is within a vicinity of the human accessory object. In one embodiment, the first sensor is generally a sensor 103 that can be operated continuously such as a vehicle camera. In one embodiment, continuously refers to keeping the sensor active in at least one operational state while the vehicle 101 is in actively navigating within the travel network 109.

In step 303, the sensor control module 107 triggers an activation of a second sensor (e.g., an advanced sensor 105) to detect a human 113 or animal that may be near the detected human accessory object 111. In one embodiment, the second sensor is in a deactivated state and is configured to be activated on a detection of the human accessory object by the first sensor to detect the human or the animal within a proximity of the vehicle, the vicinity of the human accessory, or a combination thereof.

In one embodiment, in addition or in place of the activation of a sensor of the detecting vehicle 101, the sensor control module 107 can initiate activation of other sensors such an infrastructure sensor 119 and/or sensors of one or more neighboring vehicles 101. In one embodiment, the sensor control module 107 can initiate the activation of these other sensors and then receive the sensor feeds or outputs generated by the other sensors over the communication network 118 either through direct communication or through the mapping platform 121 or other cloud component. By way of example, the infrastructure sensors 119 are stand-alone sensors installed at fixed locations within a geographic area that can include one or more sensor technologies (e.g., camera, Lidar, radar, infrared, etc.) for detecting human accessory objects 111 and/or any nearby humans 113 or animals. The infrastructure sensors 119 include communication systems for sharing and transmitting sensor feeds over, e.g., the communication network 118.

In one embodiment, neighboring vehicles 101 are vehicles located within a predetermined proximity of the vehicle 101 that detected the human accessory object or that has entered a geographic area associated with previously detected human accessory objects. Neighboring vehicles 101 can also be equipped with an array of sensors for detecting human accessory objects 111 and/or humans 113 or animals. Neighboring vehicles 101 (as well as the detecting vehicle 101) are also equipped with communication systems for sharing or transmitting sensor feeds over the communication network 118.

In one embodiment, the initial detecting vehicle 101 can combine its sensor feeds with the sensor feeds of the infrastructure sensors 119 and/or the neighboring vehicles 101 to provide a more complete coverage of the environment around the vehicle 101 to facilitate detecting humans 113 or animals that may be nearby the detecting vehicle 101.

In step 305, the sensor control module 107 sends a report of the detected human accessory object 111 and/or corresponding nearby humans 113 or animals to the mapping platform 121. For example, in one embodiment, the sensor control module 107 transmits a location where the human accessory object is detected by the first sensor, another location where the human or the animal is detected by the second sensor, or a combination thereof. In one embodiment, the time of detection is also sent. In another embodiment, the sensor control module 107 can also send images of or other information related to the human accessory object 111 that was detected to the mapping platform 121 for storage.

In step 307, the sensor control module 107 can subsequently use the mapped human accessory geographic areas or locations to trigger the activation of the second sensor. In other words, the vehicle 101 can send reports of human accessory detections to the mapping platform 121, which in turn can generate a map of the detections. The vehicle 101, as well as other vehicles 101, can then use this may to trigger sensor activation without having to actually detect the presence of a human accessory object 111. Instead, the vehicle 101 can rely on the mapping data provided by the mapping platform 121 to decide when to activate or deactivate certain sensors (e.g., to save computing resources or avoid excessive sensor wear).

In one embodiment, the system 100 provides for multiple levels of sensor activation. For example, Lidar may triggered when a detected human accessory object 111 is of a certain category (e.g., chaseable human accessory objects 111 such as a ball) and infrared can be activated when a detected human accessory object 111 is of another category (e.g., human accessory object 111 that can contain a human 113 or animal such as a stroller). In another example, Lidar can first be triggered when at a certain distance away from the detected human accessory object 111 (e.g., within a first geofenced area or distance threshold) and then both Lidar and infrared can be triggered with at a closer distance to the detected human accessory object 111 (e.g., with a second smaller geofenced area or distance threshold).

In another embodiment, as previously noted, activation of a sensor also includes triggering the activation of a different mode of operation of a sensor or operation of the sensor with different operational parameters (e.g., sampling frequency, resolution, field of view, etc.).

Figure 4:
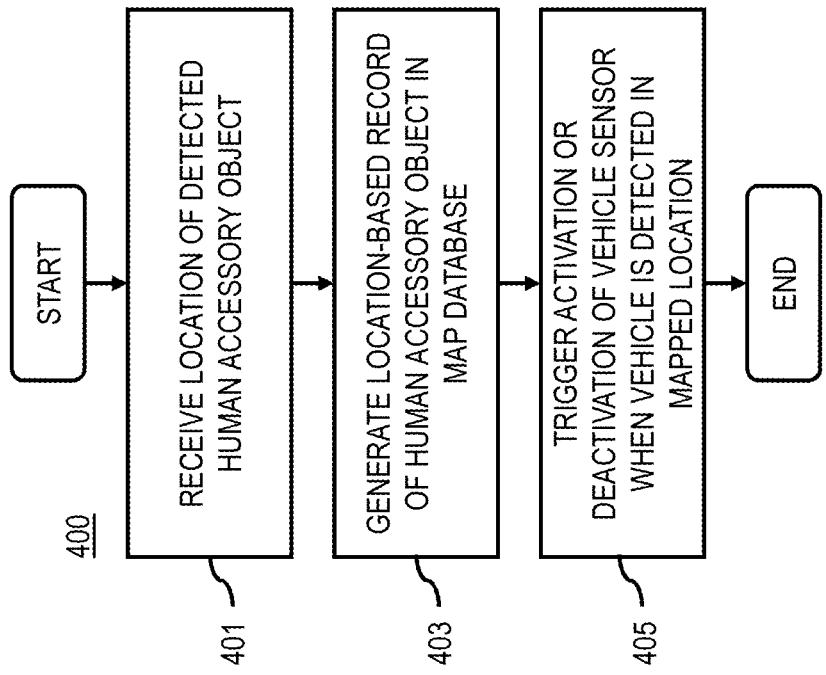
FIG. 4 is a flowchart of a process for mapping human accessory objects, according to one embodiment.

FIG. 4 is a flowchart of a process for mapping human accessory objects, according to one embodiment. In one embodiment, the mapping platform 121 performs the process 400 and is implemented in, for instance, a chip set including a processor and a memory as shown in FIG. 13. The process 400, for example, illustrates the process performed by the mapping platform 121 to process the human accessory detection reports generated as described in the process 300 of FIG. 3 as well as in the descriptions with respect to FIGS. 1 and 2 above.

In step 401, the mapping platform 121 receives a location of a detection of a human accessory object 111 in a travel network 109. For example, the location is received from reports generated by vehicles 101 traversing the travel network 109 and detecting human accessory objects 111 as they travel. These reports represent historical data on human accessory presence that is compiled by the mapping platform 121. In one embodiment, the mapping platform 121 can compile the records until a predetermined number of reports is received, a specified time period for collecting data has passed, and/or based on any other data collection criteria. For example, historical data can be collected until a sufficient number of reports are available for environmental conditions of interest (e.g., reports collected in clear weather, rainy weather, daytime lighting condition, nighttime lighting condition, etc.). In one embodiment, the mapping platform 121 also receives a temporal component of the detection of the human accessory object 111. For example, the temporal component indicates the time of the observation or detection of the human accessory object 111.

In step 403, the mapping platform 121 generates a location-based record of the human accessory object in a map database based on the location. For example, the location-based record (e.g., human accessory data record 171 of the geographic database 123) can record or describe in which geographic areas human accessory objects 111 have been detected. In one example, embodiment, locations or areas in the geographic database 123 that represent, e.g., links, intersections, nodes, road segments, etc. can be associated with a record or attribute that indicates whether the human accessory objects 111 have been detected at that location or area. Additional information such as timing or other contextual information (e.g., human accessories 111 were detected only on certain days, times, weather, etc.) can also be recorded in the location-based record. For example, in embodiments where the temporal component of the detection of the human accessory object 111 (e.g., a timestamp indication when the location of the detected human accessory object 111 was sensed), the location-based records can used to build historical models of when human accessories 111 may appear in roads of the travel network 109. Additional factors or steps that may be considered in generating a location-based record of detected human accessories 111 is further described below with respect to FIG. 5.

In step 405, the mapping platform 121 provides access to the location-based record to a vehicle 101 so that a sensor of a vehicle is activated to detect the human or the animal when the vehicle is detected to enter a geographic area of the travel network associated with the location-based record of the human accessory object. For example, a vehicle 101 using the geographic database 123 including human accessory data records 167 can determine whether it is in a marked area by comparing its current location to the geographic database 123.

In one embodiment, the sensor that is activated is an advanced sensor 105 system including an infrared sensor, Light Imaging Detection and Ranging (Lidar) sensor, a Radio Detection and Ranging (Radar) sensor, or a combination thereof. These advanced sensors 105 can generate large amounts of data and require extensive computing resources to process. Accordingly, the various embodiments described herein enables activation of the advanced sensors 105 only when they are likely to be needed (e.g., when humans 113 are likely to be around based on the detected presence of human accessory objects 111). Accordingly, in one embodiment, the sensor is deactivated when the vehicle is detected to exit the geographic area to avoid or otherwise reduce continuous use of the advanced sensor 105 and reduce computing resources for acquiring, storing, and/or processing the resulting sensor feeds.

Figure 5:
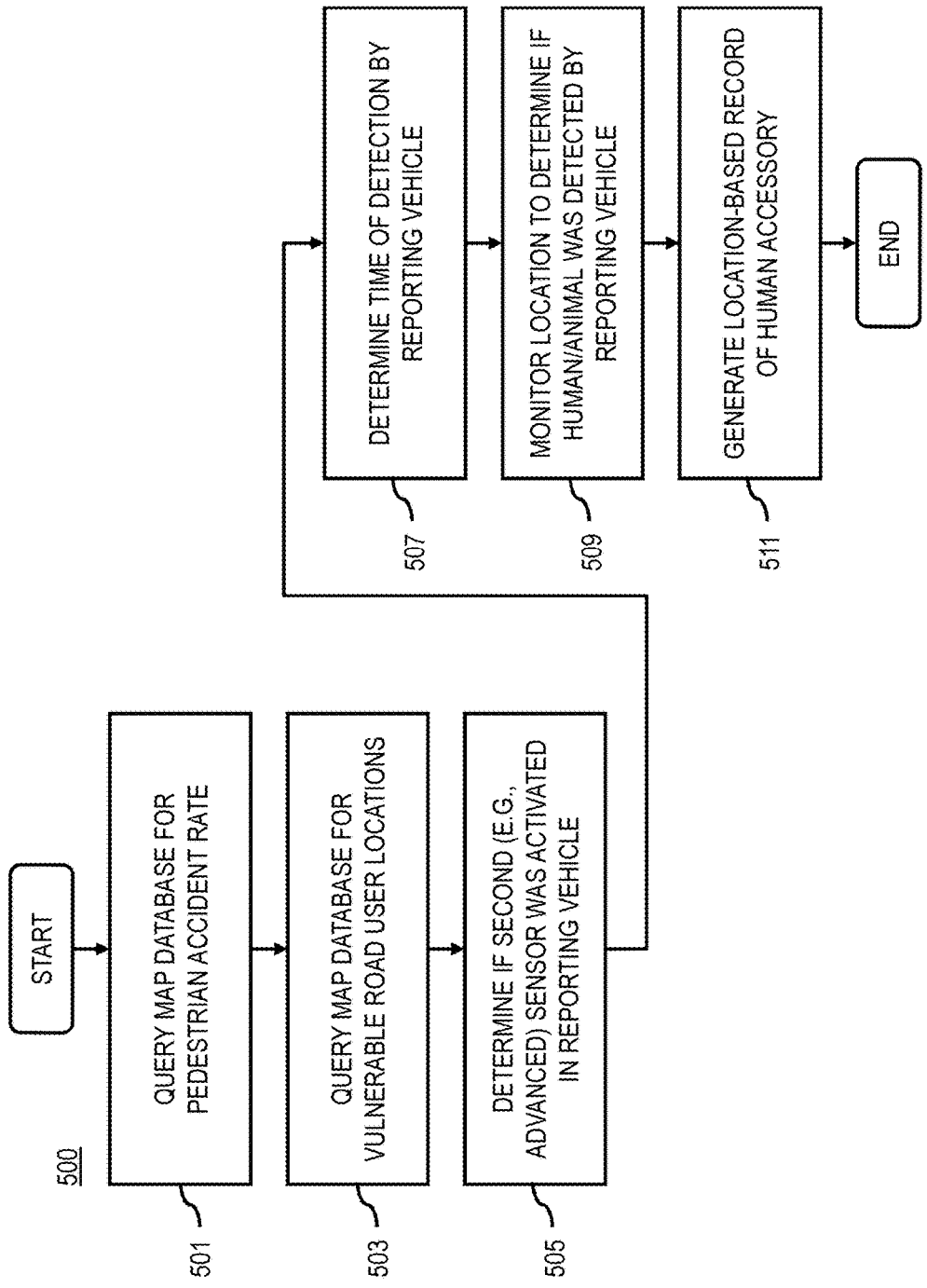
FIG. 5 is a flowchart of a process for generating a location-based record in a map database to map human accessory objects, according to one embodiment.

FIG. 5 is a flowchart of a process for generating a location-based record in a map database to map human accessory objects, according to one embodiment. In one embodiment, the mapping platform 121 performs the process 500 and is implemented in, for instance, a chip set including a processor and a memory as shown in FIG. 13. The process 500 illustrates optional steps that can be performed by the mapping platform 121 to generate a map or location-based records for triggering vehicle sensor activation based on human accessory detection. The steps can be performed in any or order or combination and need not be performed as an entire sequence (e.g., one or more of the steps may be omitted in various embodiments).

In step 501, the mapping platform 121 queries the map database to determine a pedestrian accident rate associated with the location of the detection of the human accessory object 11. In one embodiment, accident rate records may record a composite accident rates including accidents that do not involve pedestrians. Accordingly, the mapping platform 121 may use a filtering process to determine an accident associated specifically with pedestrians. In one embodiment, the location-based record is generated when the pedestrian accident rate is above an accident threshold value. In other words, the mapping platform 121 can map areas with high pedestrian accident rates (e.g., rates above an accident rate threshold value) queried from the accident rate data records 169 of the geographic database and/or other accident rate databases. In one embodiment, entering these areas can also trigger sensor activation similar to entering an area of previously detected human accessories. In one embodiment, the mapping platform 121 can determine areas of overlap between the accident rate and detected human accessory objects 111 and then trigger sensor activation based on the overlapping areas, or trigger additional advanced sensors 105 beyond the sensors already activated.

In step 503, the mapping platform 121 queries the map database to determine whether the geographic area includes at least one vulnerable road user location. In one embodiment, the sensor of the vehicle is activated when the vehicle is detected to enter the geographic area that includes the at least one vulnerable road user location. Areas with vulnerable road user locations can then be mapped by the mapping platform 121 to trigger sensor activation as stated above. In one embodiment, the mapping platform 121 can further specify areas of overlap between any of the detected human accessory areas, high pedestrian accident areas, and/or vulnerable road user location areas.

In one embodiment, the detection of the human accessory object 111 is performed by a reporting vehicle 101 traversing the travel network. In step 505, the mapping platform 121 generates the location-based record of the human accessory object based on determining that the reporting vehicle activated a sensor of the reporting vehicle in response to the detection. In one embodiment, the activating of the sensor of the reporting vehicle is for detecting the human or the animal. In other words, the mapping platform 121 can map detected human accessory areas using a two stage process. First, the mapping platform 121 is alerted to a candidate area when the reporting vehicle 101 submits an initial report that it has detected a human accessory object 111. Then, the mapping platform 121 determines whether the reporting vehicle subsequently reports detecting a human 113 or animal after detecting the human accessory 111 and activating additional sensors. In one embodiment, the mapping platform 121 generates the location-based record to mark the location or area as being associated with previously detected human accessories if a subsequent human detection is made.

In step 507, the mapping platform 121 determines a time when the reporting vehicle activated the sensor of the reporting vehicle. The location-based record is generated to include a temporal parameter based on the time. For example, the mapping platform 121 identify time periods when human accessories 111 and corresponding nearby humans 113 or animals are likely to be detected. These time periods can then be recorded as a temporal parameter associated with the corresponding location-based record of the geographic database 123. In this way, sensor activation may be triggered only during those times when human accessories 111 are more likely to be detected as indicated in the mapping data of the geographic database.

In step 509, the mapping platform 121 monitors the location of the detection of a human accessory object 111 for one or more subsequent detections of the human accessory object, another human accessory object, or combination thereof by one or more other vehicles. In one embodiment, the location-based record of the human accessory object is created when the one or more other vehicles further detect a presence of the human or the animal at the location. For example, the mapping platform 121 can mark a particular location or area as being associated with detected human accessories 111, and then continue to monitor whether other vehicles 101 also detect human accessories 111 at that location. Based on this continued monitoring, the mapping platform 121 can update the corresponding location-based record in the geographic database 123.

In one embodiment, the location-based record is associated with a confidence value indicating, for instance, a confidence of detecting the human accessory object 111 or similar human accessories 111 at or near the same location. In this case, the mapping platform 121 uses the continued monitoring of the area to adjust the confidence value associated with the location-based record. For example, if subsequent vehicles 101 traveling in the same area report detecting human accessories 111, the mapping platform 101 increases the confidence value. On the other hand, if subsequent vehicles 101 traveling in the same area report not detecting human accessories 111 at or near the location, the mapping platform decreases the confidence value. In one embodiment, if the value decreases below a threshold value, the mapping platform 121 can remove or otherwise deactivate the location-based record until the confidence value increases above the threshold value or a new record for the location is created. By way of example, deactivating the location-based record refers to stopping the user of the location-based record for triggering vehicle sensors when vehicles are detected to enter the area specified in the location-based record.

In step 511, the mapping platform 121 generates the location-based record based on any combination of one or more of the steps 501-509.

Figure 6:
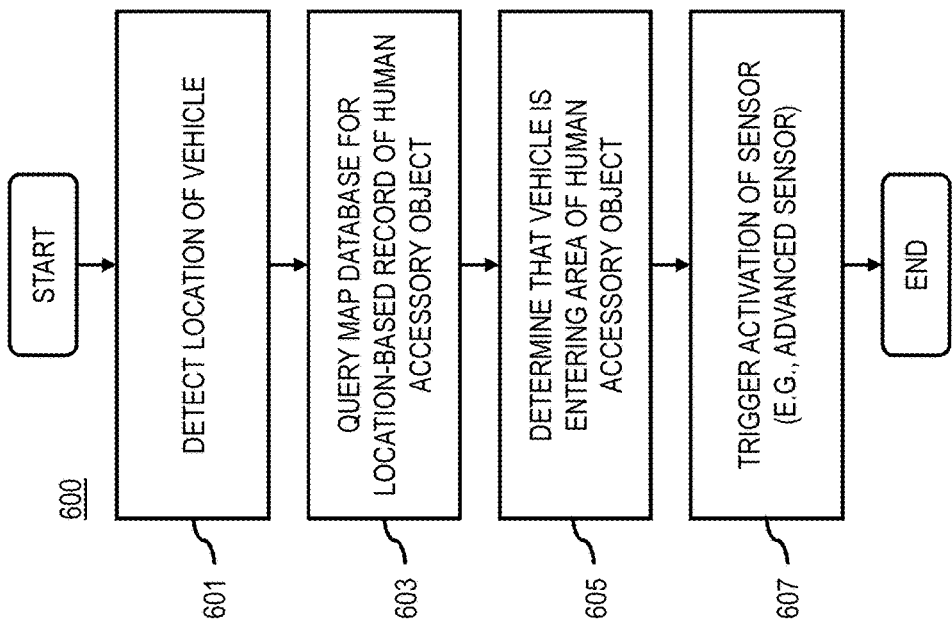
FIG. 6 is a flowchart of a process for activating a sensor based on map data indicating a presence of human accessory objects, according to one embodiment.

FIG. 6 is a flowchart of a process for activating a sensor based on map data indicating a presence of human accessory objects, according to one embodiment. In one embodiment, the sensor control module 107 or other module of the vehicle 101 performs the process 600 and is implemented in, for instance, a chip set including a processor and a memory as shown in FIG. 13. The process 600 describes a process for using map data that has already be been generated according the processes described above with respect to FIGS. 4 and 5.

In step 601, the sensor control module 107 of the vehicle 101 detects a location of a vehicle traversing a travel network 109. By way of example, the vehicle 101 may be equipped a positioning system (e.g., satellite based positioning) to determine its location within the travel network 109. In one embodiment, the vehicle 101 may be configured with both sensors 103 (e.g., a camera sensor for detecting human accessory objects 111 in its path) and advanced sensors 105 (e.g., Lidar, infrared, etc. sensors for detecting humans or animals associated with human accessories 111). In one embodiment, the sensors 103 are operated continuously while the advanced sensors 105 are in a deactivated state until triggered according to the processes described herein. In yet another embodiment, both the sensors 103 and the advanced sensors 105 may initially be in deactivated state until triggered according to the processes described herein.

In step 603, the sensor control module 107 queries a map database (e.g., the geographic database 123) for a location-based record based on the location of the vehicle 101. In one embodiment, the location-based record is generated to indicate whether a geographic area of the travel network is associated with a human accessory object 111 that has been previously mapped to the geographic area. As previously discussed, the human accessory object 111 is a physical object associated with a probability that a human or an animal is within a vicinity of the human accessory object.

In one embodiment, the location-based record may indicate or mark a location or geographic area to automatically trigger sensor activation based on factor in addition to or in place of detected human accessory objects 111. As previously described, these factors can include areas of high pedestrian accident rates and/or areas with vulnerable road user locations as indicated in the geographic database 123 or other similar map data. In one embodiment, the location-based record may specify a geofenced area and/or distance threshold for use by the sensor control module 107 to determine whether the vehicle 101 has entered or exited a location or area associated with the location-based record.

In step 605, the sensor control module 107 determines that the vehicle is entering the geographic area that is associated with the human accessory object, high pedestrian accident rate, and/or vulnerable road user locations. As previously discussed, the sensor control module 107 can use a geofence or distance threshold to determine when the vehicle is entering or exiting the area.

In step 607, the sensor control module 107 triggers an activation of a sensor of the vehicle to detect a human 113 or the animal associated with the human accessory object or expected to be within the geographic area. In one embodiment, as noted above, the vehicle 101 operates with sensors 103 (e.g., a camera sensor) continuously operating to independently detect human accessory objects 111 (e.g., apart location-based records of previously detected human accessories 111 stored in the geographic database 123). In this embodiment, the sensor being activated can either be a more advanced operating mode of the sensor 103 (e.g., wider scanning field of view, higher resolution, higher scan rates, etc. of the same previously activated sensor 103) and/or an advanced sensor 105 that was previously unactivated. In this way, the more advanced operational state of sensor 103 and/or the advanced sensors 105 can be activated to immediately begin scanning for any nearby humans or animals that may be expected to be within vicinity of human accessory objects 111.

In another embodiment, when both sensors 103 and advanced sensors 105 are in a deactivated state, the sensor control module 107 can activate a sensor 103 (e.g., a camera sensor) to begin scanning for human accessory objects 111 on entering a marked area determined from the location-based record. If a human accessory object 111 is then detected by the newly activated sensor 103, then the sensor control module 107 can further trigger activation of a more advanced operational state of sensor 103 and/or the advanced sensors 105 to begin scanning for humans or animals associated human accessory objects 111. In one embodiment, this mode in which both sensors 103 and advanced sensors 105 start from a deactivated stated can be used when, for instance, the confidence value associated with detected human accessory records is below a certain threshold but above the threshold value for maintaining the record. Similarly, the sensor 103 can be operated continuously above if nearby location-based records of detected human accessories 111 are associated with confidence values above a threshold value.

In addition to or as an alternate to activating a sensor of the vehicle, the sensor control module 107 can interact with other control systems of the vehicle 101 to initiate other operational reactions to entering an area associated with previously mapped human accessories 111. For example, the vehicle 101 can be configured to react by automatically slowing down to a predetermined speed, instructing a driver or occupant to take manual control, taking an alternate route, and/or the like. It is contemplated that the operational reaction of the vehicle 111 can be any maneuver or programming configuration of the vehicle 101 that can alter the vehicle 101's operation in response to detecting of the human accessories 111.

In one embodiment, the sensor control module 107 determines that the vehicle is exiting the geographic area that is associated with the human accessory object, and triggers a deactivation of the sensor of the vehicle.

Figure 7:
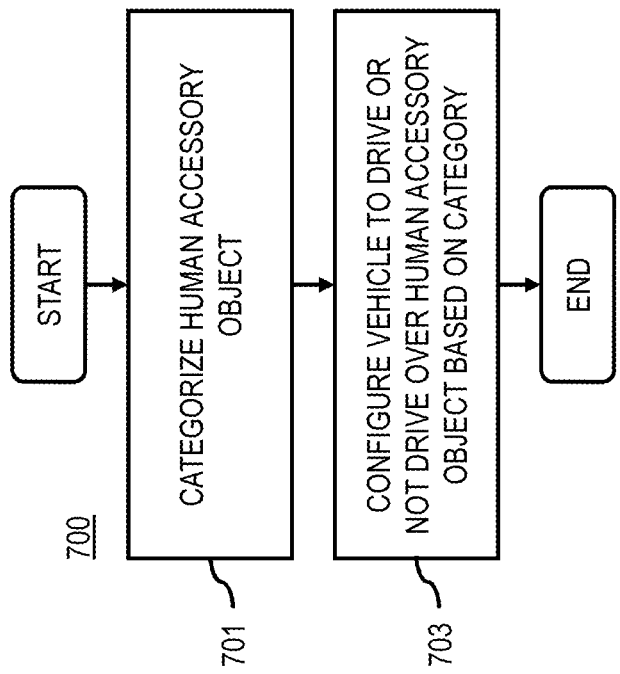
FIG. 7 is flowchart of a process for categorizing human accessory objects to configure a vehicle, according to one embodiment.

FIG. 7 is flowchart of a process for categorizing human accessory objects to configure a vehicle, according to one embodiment. In one embodiment, the sensor control module 107 or other module of the vehicle 101 performs the process 700 and is implemented in, for instance, a chip set including a processor and a memory as shown in FIG. 13. In one embodiment, the vehicle can be an autonomous vehicle or a highly assisted driving vehicle capable of driving in the travel network 109 with little or no user driving input.

In step 701, the sensor control module 107 categorizes the human accessory object 111 as either a first object type or a second object type. In one embodiment, the first object type is a human accessory 111 that is chaseable or gatherable by a human 113 or animal, and the second object type is a human accessory 111 that is a non-vehicular object that contains the human or the animal. For example, a chaseable or gatherable human accessory object 111 is likely to have a human 113 or animal nearby. In contrast, a human accessory object 111 of the second type contains the human 113 or animal so that collision with the object 111 also means a collision with the human 113 or animal contained therein.

Accordingly, in step 703, the sensor control module 107 configures an autonomous vehicle to drive over the human accessory object when the human accessory object is categorized as the first object type. The sensor control module 107 configures the autonomous vehicle to not drive over the human accessory object when the human accessory object is categorized as the second object type. Similarly, if the vehicle 101 is not autonomously operated, the sensor control module 107 can provide a warning with respect to the category of human accessory detected 101 (e.g., "Warning: approaching an object containing a human or animal, take action to avoid."). In one embodiment, the non-autonomous vehicle 101 can activate an automatic braking system to avoid a collision with the second type of human accessory object 111 if the driver fails to take action.

Figure 8:
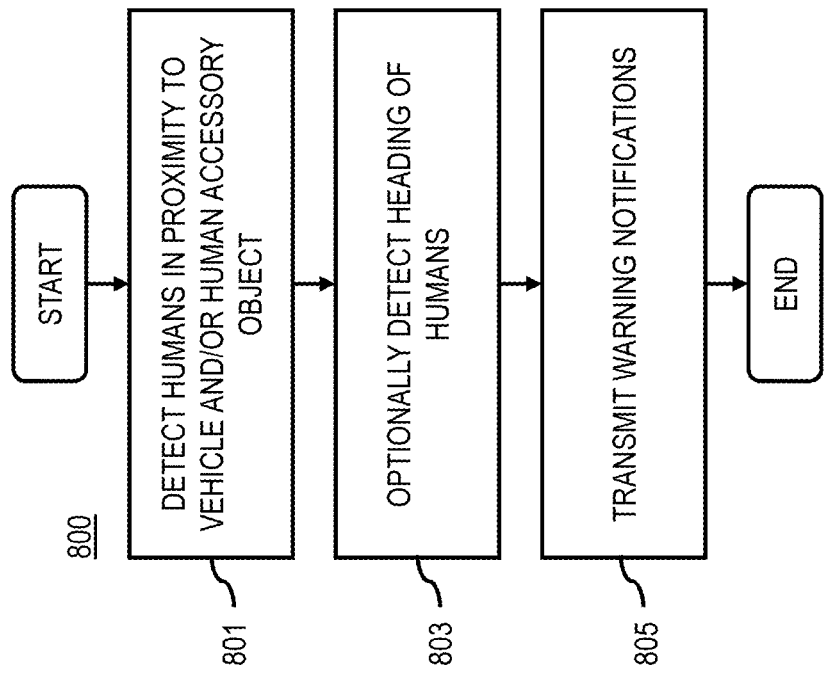
FIG. 8 is a flowchart of a process for transmitting warning notifications based on detecting a human accessory object, according to one embodiment.

FIG. 8 is a flowchart of a process for transmitting warning notifications based on detecting a human accessory object, according to one embodiment. In one embodiment, the sensor control module 107 or other module of the vehicle 101 performs the process 800 and is implemented in, for instance, a chip set including a processor and a memory as shown in FIG. 13. The process 800 assumes that a vehicle 101 has detected a human accessory object 111 or has entered an area marked as being associated with previously detected human accessory objects 111, resulting in an automatic triggering a vehicle sensor.

In step 801, the sensor control module 107 detects, via the triggered or activated sensor, that a human or one or more other humans are within a proximity of the vehicle, the human accessory object, or a combination thereof. For example, Lidar or infrared sensors may indicate a presence of nearby humans within vicinity of the detected human accessory object 111 or the vehicle.

In step 803, the sensor control module 107 optionally detects, via the sensor, that the human or the one or more other humans are heading towards the vehicle 101. For example, infrared sensors can detect the movement of the humans to determine whether traveling on a path that can potentially result in a collision with the vehicle 101.

In step 805, the sensor control module 107 transmits a warning notification to a device (e.g., UE 115) associated with the human, the one or more other humans, or a combination thereof. In one embodiment, the warning is transmitted to all detected humans or human detected within a distance threshold. In another embodiment, the warning is transmitted only to humans who are detected to be heading towards the human accessory object and/or the vehicle.

In one embodiment, the warning is transmitted is transmitted using a peer-to-peer protocol (e.g., short range wireless such as Bluetooth or WiFi) to make a direct communication connection. In addition or alternatively, the warning notification may be transmitted via a cloud-based service (e.g., via the mapping platform 121) to which the approaching humans are subscribed. As previously described, the mapping platform 121 or other cloud service may the location of subscribers so that if a vehicle 101 requests or triggers the transmission of a warning notification, the mapping platform 121 can identify the subscribers by their locations (e.g., as shared by their respective UEs 115) to transmit the warning notification if they are within the identified area.

Figure 9:
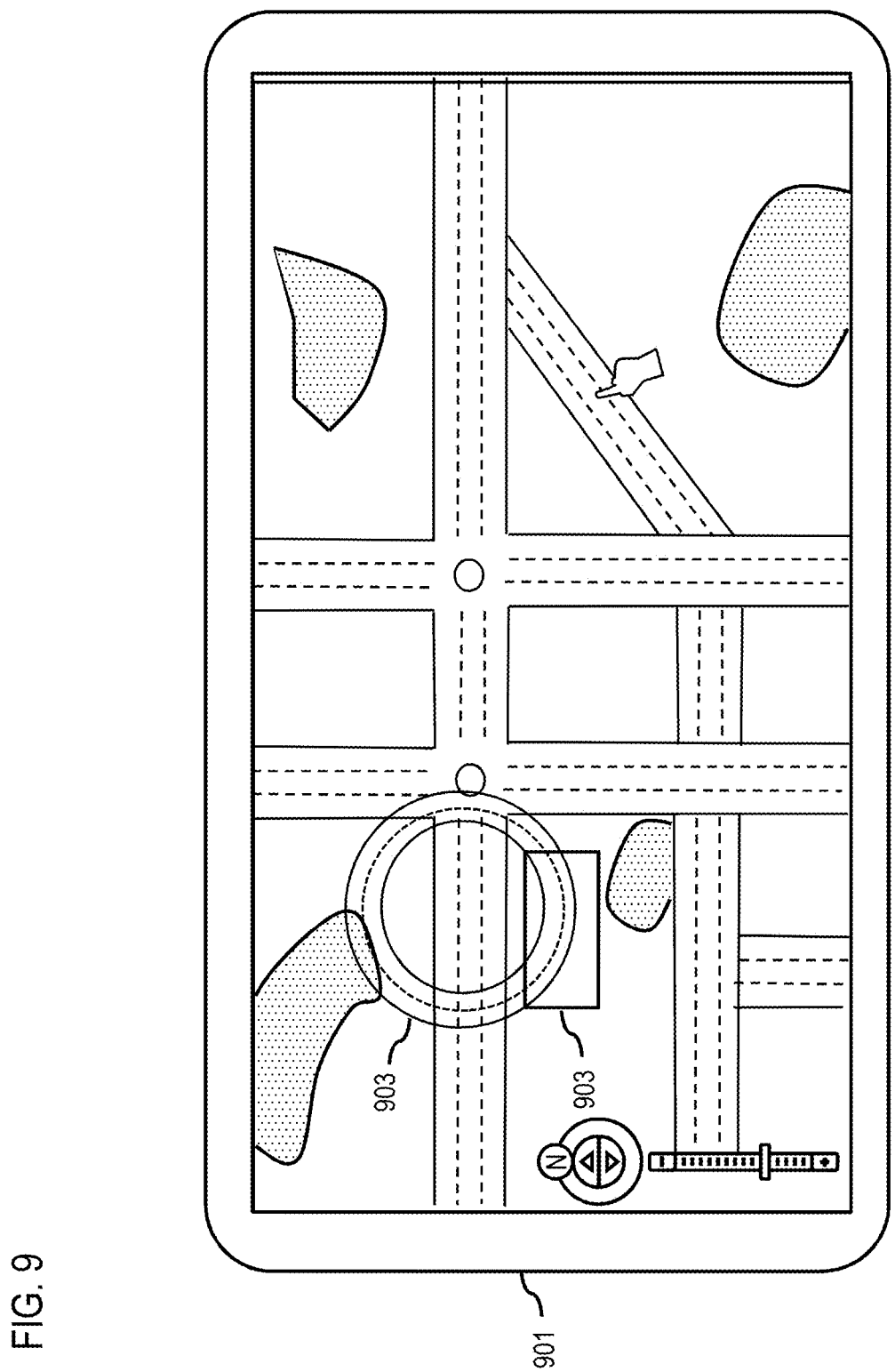
FIG. 9 is a diagram of a map user interface depicting mapped human accessory objects, according one embodiment.

FIG. 9 is a diagram of a map user interface depicting mapped human accessory objects, according one embodiment. As shown, a map user interface 901 depicts a geographic area include a POI 903. In this example, the POI 903 is a park located next to a street on which human accessory objects 111 (e.g., balls, toys, wagons, etc.) are have been frequently detected by vehicles 101 traveling by the park. The vehicles have transmitted reports of the detected human accessories 111 to the mapping platform 121. The mapping platform 121 has generated a location-based records marking the area of the street in front of the park an area in which human accessories 111 have been frequently detected. The mapping platform 121 has also confirmed that humans 113 have been detected at a frequency above a threshold value following the corresponding detection of the respective human accessory 111. As a result, the mapping platform 121 has designated the delineated area 903 as an area in which previously unactivated advanced sensors 105 of vehicles 101 entering the area 903 would be activated to scan for and detect possible humans 113 that may be in the area 903 to provide for improved pedestrian safety. Vehicles exiting area 903 would also deactivate the advanced sensor 105 to conserve resources and reduce sensor wear, because the vehicle is likely to encounter a human or pedestrian outside the area 903.

Figure 10:
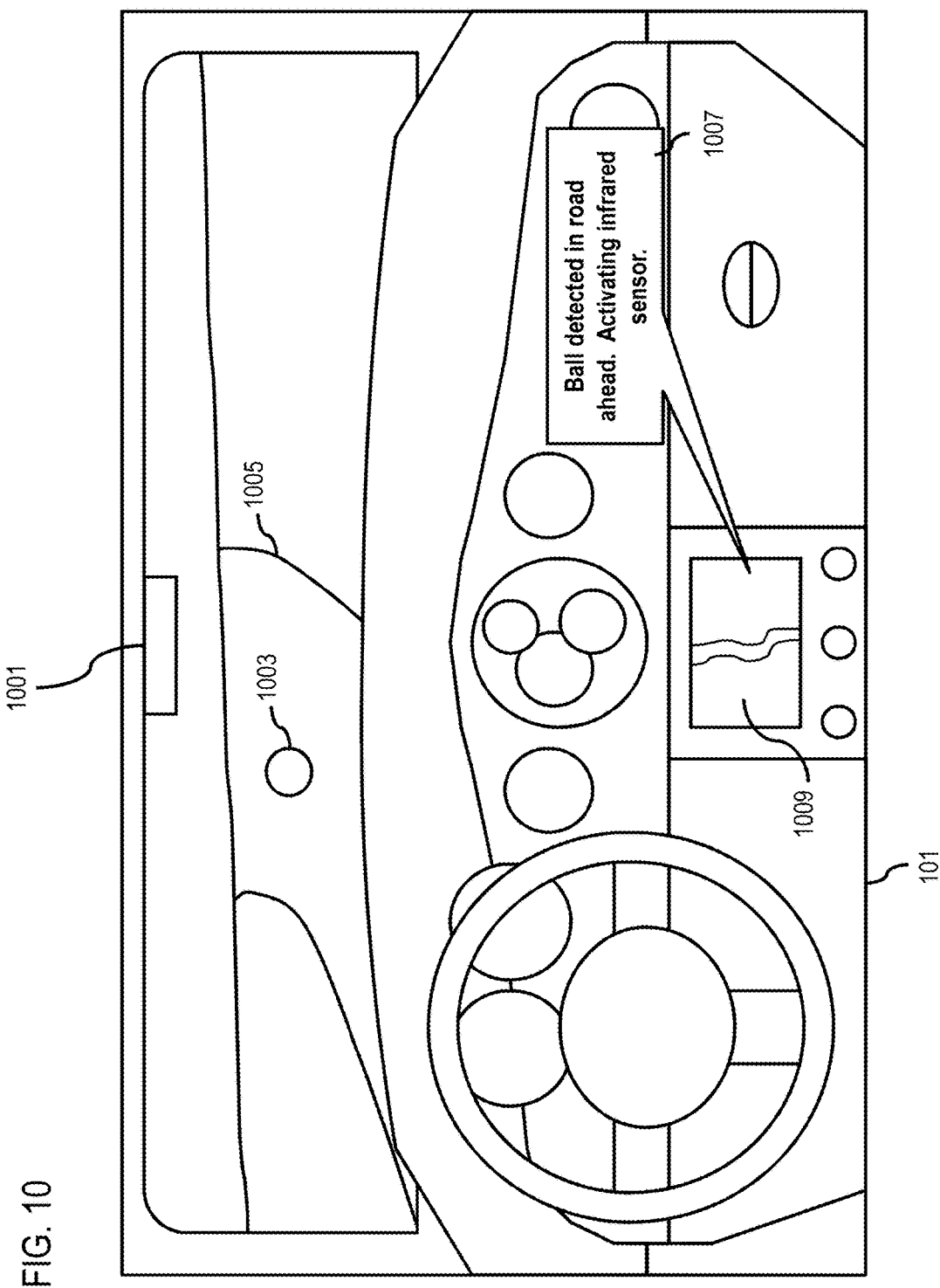
FIG. 10 is a diagram illustrating a vehicle user interface for displaying human accessory objects to trigger a vehicle sensor, according to one embodiment.

FIG. 10 is a diagram illustrating a vehicle user interface for detecting human accessory objects to trigger a vehicle sensor, according to one embodiment. As shown, a vehicle 101 is equipped with a camera sensor 1001 that is operated continuously to scan for and detected human accessory objects 111. In this example, a ball 1003 is detected in the road 1005. A sensor control system 107 (not shown) of the vehicle 101 is programmed to designate the ball as a human accessory 111 that is classified with a high probability of being chased by a human 113 or animal. Accordingly, the sensor control system 107 automatically activates an infrared sensor (not shown) of the vehicle 101, which was previously unactivated before the ball 1003. The vehicle presents a message 1007 indicating that the ball 1003 has been detected and that the infrared sensor is being activated to scan for possible nearby humans 113 or animals. At the same time, the vehicle 101 presents a sensor feed from the infrared signal in the vehicle display 1009. Once the vehicle 101 passes the ball 1003 beyond a predetermined distance, the sensor control module 103 can deactivate the infrared sensor as the vehicle 101 continues on its trip.

Figure 11:
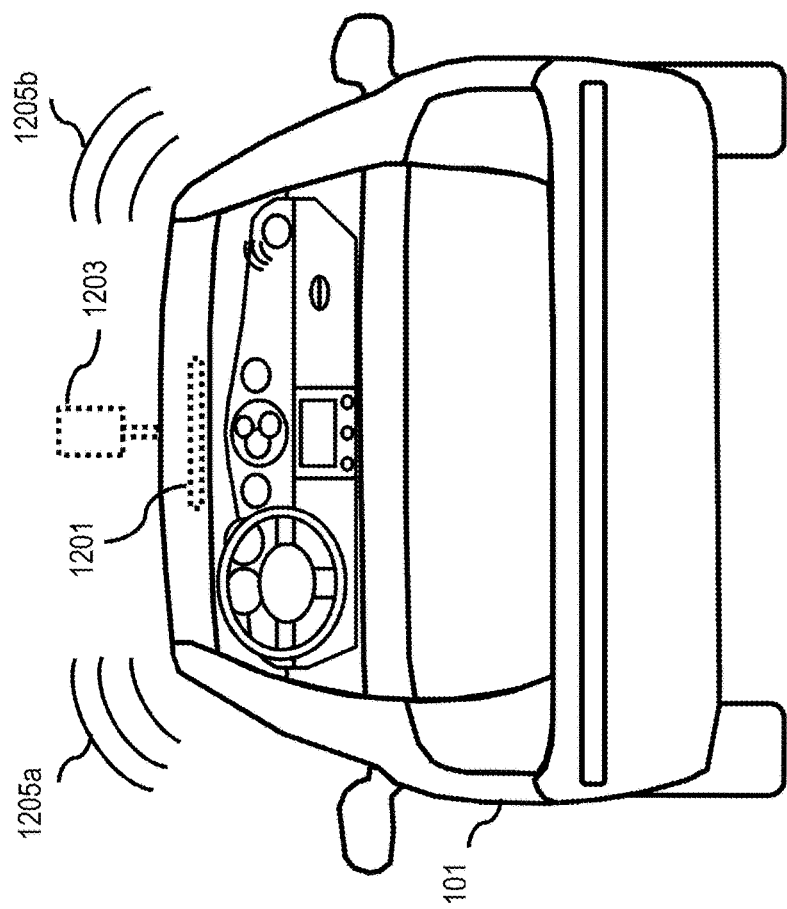
FIG. 11 is a diagram illustrating a vehicle that is equipped with sensors that can be trigged based on detecting a human accessory object, according to one embodiment.

FIG. 11 is a diagram illustrating a vehicle that is equipped with sensors that can be trigged based on detecting a human accessory object, according to one embodiment. As shown, a vehicle 101 is equipped with a camera sensor 1201, a Lidar sensor 1203, and an infrared sensors 1205a and 1205b (also collectively referred to as infrared sensors 1205). The Lidar sensor 1203 and the infrared sensors 1205 are examples of the advanced sensors 105 described above. In a normal mode of operation according to the various embodiments described herein, the camera sensor 1201 (an example a sensor 103 described above) is operated continuously as the vehicle travels to detect human accessory objects 111 using image analysis and object recognition. Under this normal mode, the Lidar sensor and the infrared sensors 1205 are deactivated until the camera sensor 1201 detects a human accessory object 111.

In one embodiment, the Lidar sensor 1203 is a retractable sensor that unretracts when activated. In addition, the Lidar sensor 1203 includes a rotating body that spins as the sensor scans the surrounding environment to provide a 360° Lidar image or point cloud. The retracting mechanism and the rotating mechanism of the Lidar sensor 1203 can be susceptible to wear with repeated or extended use. The infrared sensors use an active infrared illumination system to provide improved images and longer range. Accordingly, the system 100 can employ embodiments of the sensor triggering process of the various embodiments described herein to reduce wear the on the sensors 1203 and 1205, and to reduce the need to process their resulting sensor feeds.

The processes described herein for triggering a vehicle sensor based on human accessory detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
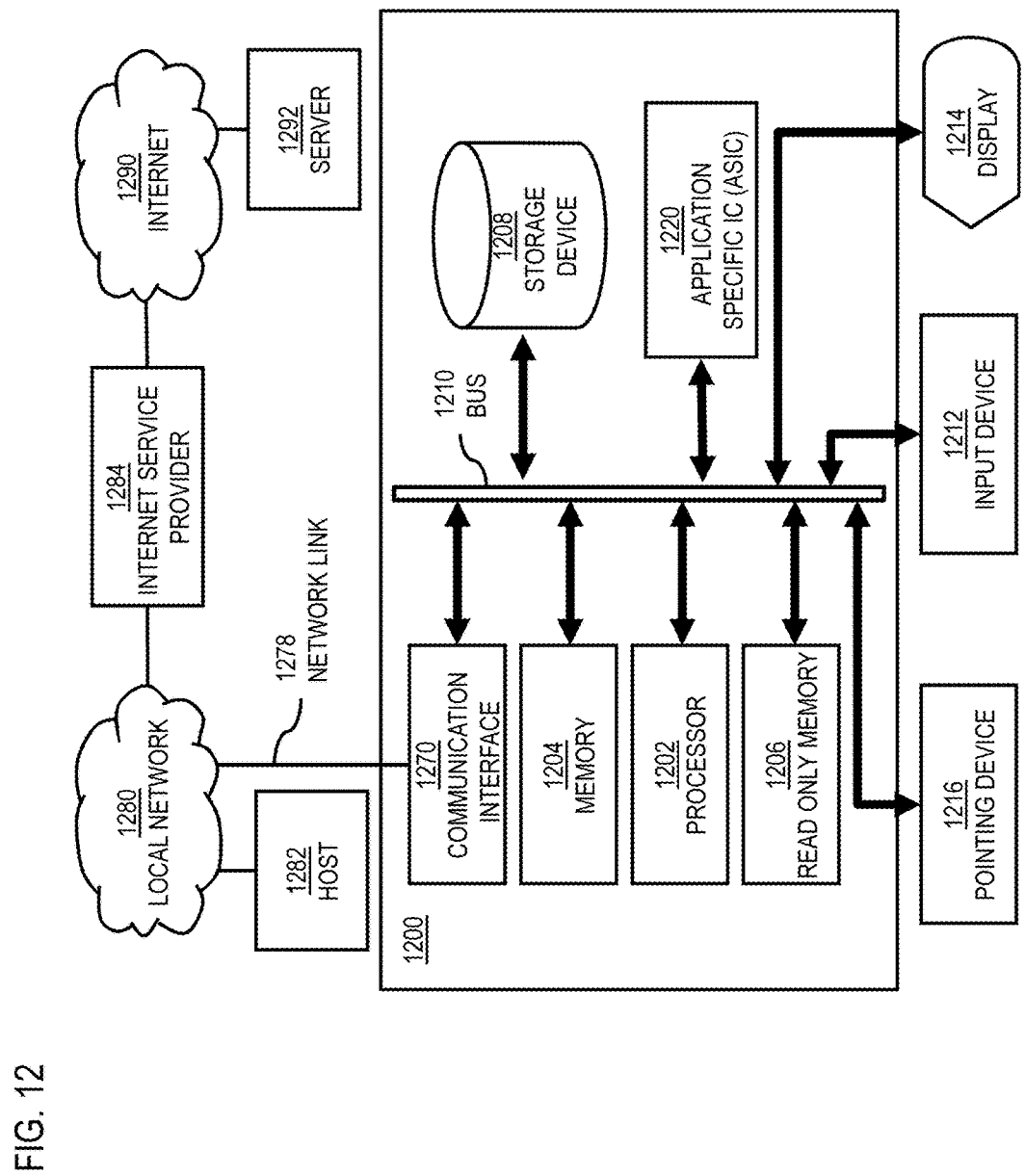
FIG. 12 is a diagram of hardware that can be used to implement an embodiment of the invention.

FIG. 12 illustrates a computer system 1200 upon which an embodiment of the invention may be implemented. Computer system 1200 is programmed (e.g., via computer program code or instructions) to trigger a vehicle sensor based on human accessory detection as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to triggering a vehicle sensor based on human accessory detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for triggering a vehicle sensor based on human accessory detection. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for triggering a vehicle sensor based on human accessory detection, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 118 for triggering a vehicle sensor based on human accessory detection.

The term non-transitory computer-readable medium is used herein to refer to any medium that participates in providing information to processor 1202, including instructions for execution. Such a medium may take many forms, including, but not limited to, non-volatile media, volatile media and transmission media. Non-volatile or non-transitory media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in any of FIGS. 12-14), cause an apparatus (e.g., the mapping platform 121, the vehicles 101, the UEs 115, etc.) to perform any steps of the various embodiments of the methods described herein.

FIG. 13 illustrates a chip set 1300 upon which an embodiment of the invention may be implemented. Chip set 1300 is programmed to trigger a vehicle sensor based on human accessory detection as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to trigger a vehicle sensor based on human accessory detection. The memory 1305 also stores the data associated with or generated by the execution of the inventive steps.

Figure 14:
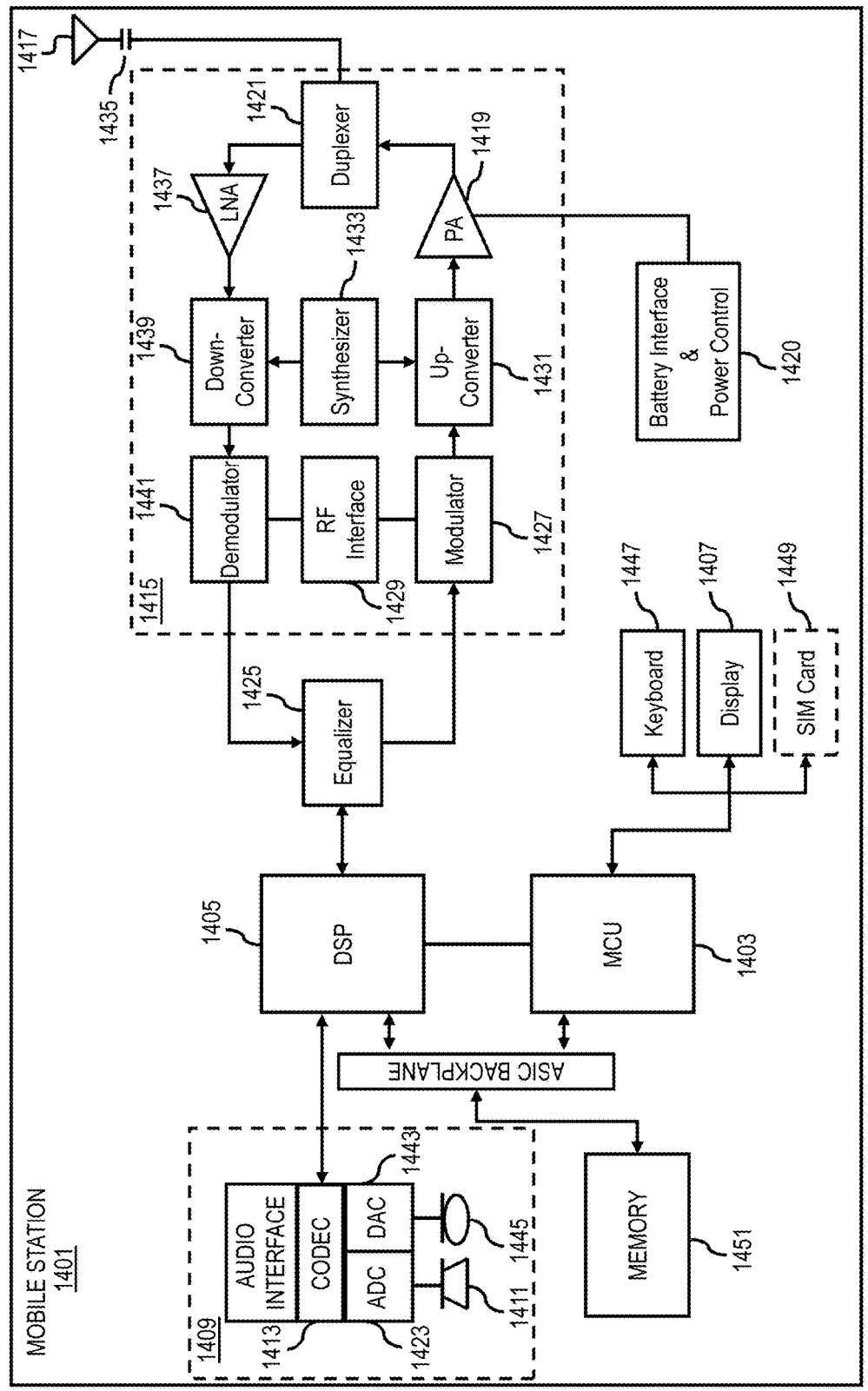
FIG. 14 is a diagram of a mobile terminal (e.g., handset) that can be used to implement an embodiment of the invention.

FIG. 14 is a diagram of exemplary components of a mobile station (e.g., handset) capable of operating in the system of FIG. 1, according to one embodiment. In one embodiment the mobile station can be the vehicle 101 or a component of the vehicle 101 configured to perform or more of the embodiments described herein. In another embodiment, the mobile station is an example of the UE 115 and can perform embodiments of the processes associated with functions of the UE 115. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to trigger a vehicle sensor based on human accessory detection. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable non-transitory computer readable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for activating a vehicle sensor based on mapped human accessory objects comprising:
   receiving, by an apparatus, a location of a detection of a human accessory object in a travel network, wherein the human accessory object is a mobile physical object associated with a probability that a human or an animal is within a vicinity of the human accessory object; and generating, by the apparatus, a location-based record of the human accessory object in a map database based on the location, wherein a sensor of a vehicle is activated to detect the human or the animal when the vehicle is detected to enter a geographic area of the travel network associated with the location-based record of the human accessory object.

2. The method of claim 1, wherein the sensor is deactivated when the vehicle is detected to exit the geographic area, and wherein the human accessory object is chaseable or gatherable by the human or the animal, or the human accessory object is a human accessory that contains the human or the animal.

3. The method of claim 1, further comprising:

querying the map database to determine a pedestrian accident rate associated with the location of the detection of the human accessory object, wherein the location-based record is generated when the pedestrian accident rate is above an accident threshold value.

4. The method of claim 1, further comprising:

querying the map database to determine whether the geographic area includes at least one vulnerable road user location, wherein the sensor of the vehicle is activated when the vehicle is detected to enter the geographic area that includes the at least one vulnerable road user location.

5. The method of claim 1, wherein the detection of the human accessory object is performed by a reporting vehicle traversing the travel network, the method further comprising:

generating the location-based record of the human accessory object based on determining that the reporting vehicle activated a sensor of the reporting vehicle in response to the detection, wherein the activating of the sensor of the reporting vehicle is for detecting the human or the animal.

6. The method of claim 5, further comprising:

determining a time when the reporting vehicle activated the sensor of the reporting vehicle, wherein the location-based record is generated to include a temporal parameter based on the time.

7. The method of claim 1, wherein the sensor is an advanced sensor system including an infrared sensor, Light Imaging Detection and Ranging (Lidar) sensor, a Radio Detection and Ranging (Radar) sensor, or a combination thereof.

8. The method of claim 1, further comprising:

monitoring the location of the detection of a human accessory object for one or more subsequent detections of the human accessory object, another human accessory object, or a combination thereof by one or more other vehicles, wherein the location-based record of the human accessory object is created when the one or more other vehicles further detect a presence of the human or the animal at the location.

9. An apparatus for activating a vehicle sensor based on mapped human accessory objects comprising:

at least one processor; and at least one memory including computer program code for one or more programs, the at least one memory and the computer program code configured to, with the at least one processor, cause the apparatus to perform at least the following, detect a location of a vehicle traversing a travel network;

query a map database for a location-based record based on the location of the vehicle, wherein the location-based record is generated to indicate whether a geographic area of the travel network is associated with a human accessory object that has been previously mapped to the geographic area, and wherein the human accessory object is a mobile physical object associated with a probability that a human or an animal is within a vicinity of the human accessory object;

determine that the vehicle is entering the geographic area that is associated with the human accessory object; and trigger an activation of a sensor of the vehicle to detect the human or the animal associated with the human accessory object.

10. The apparatus of claim 9, wherein the apparatus is further caused to:

determine that the vehicle is exiting the geographic area that is associated with the human accessory object; and trigger a deactivation of the sensor of the vehicle.

11. The apparatus of claim 9, wherein the vehicle is an autonomous vehicle, and wherein the apparatus is further caused to:

categorize the human accessory object as either a first object type or a second object type, wherein the first object type is a human accessory that is chaseable or gatherable by the human or the animal; and wherein the second object type is a human accessory that contains the human or the animal.

12. The apparatus of claim 11, wherein the apparatus is further caused to:

configure the autonomous vehicle to drive over the human accessory object when the human accessory object is categorized as the first object type.

13. The apparatus of claim 11, wherein the apparatus is further caused to:

configure the autonomous vehicle to not drive over the human accessory object when the human accessory object is categorized as the second object type.

14. The apparatus of claim 11, wherein the apparatus is further caused to:

detect, via the sensor, that the human or one or more other humans are within a proximity of the vehicle, the human accessory object, or a combination thereof transmit a warning notification to a device associated with the human, the one or more other humans, or a combination thereof.

15. The apparatus of claim 14, wherein the apparatus is further caused to:

detect, via the sensor, that the human or the one or more other humans are heading towards the vehicle, wherein the warning notification is transmitted to the device associated with the human or the one or more other humans are heading towards the vehicle.

16. A non-transitory computer readable storage medium carrying one or more sequences of one or more instructions which, when executed by one or more processors, cause, at least in part, an apparatus to perform:

receiving a report from a vehicle, wherein the report specifies a location where a human accessory object was detected by a first sensor of a vehicle and another location where a human or animal was detected by a second sensor of the vehicle, wherein the human accessory object is a physical object associated with a probability that a human or an animal is within a vicinity of the human accessory object, and wherein the second sensor of the vehicle is in a deactivated state and is configured to be activated on a detection of the human accessory object by the first sensor; and generating a location-based record of the human accessory object in a map database based on the location, the another location, or a combination thereof.

17. The non-transitory computer-readable storage medium of claim 16, wherein another vehicle is configured to activate another sensor to detect the human or the animal when the another vehicle is detected to enter a geographic area of the travel network associated with the location-based record of the human accessory object, and to deactivate the another sensor when the another vehicle is detected to exit the geographic area.

18. The non-transitory computer-readable storage medium of claim 17, wherein the another vehicle is configured with a display device, and wherein the display device presents a user interface depicting a visual representation of an output of the another sensor as the another sensor scans the geographic area to detect the human or the animal.

19. The non-transitory computer-readable storage medium of claim 17, wherein the apparatus is further caused to perform:

determining an infrastructure sensor based on the geographic area; and triggering an activation or a deactivation of the infrastructure sensor to detect the human accessory object, the human, the animal or a combination thereof.

20. The non-transitory computer-readable storage medium of claim 17, wherein the apparatus is further caused to perform:

determining a neighboring vehicle within proximity to the vehicle, wherein the neighboring vehicle is configured with a neighboring sensor configured to detect the human accessory object, the human, the animal, or a combination thereof; and triggering an activation of a deactivation of the neighboring sensor to detect the human accessory object, the human, the animal or a combination thereof.

* * * * *